US007676656B2

(12) United States Patent
Luick

(10) Patent No.: US 7,676,656 B2
(45) Date of Patent: *Mar. 9, 2010

(54) MINIMIZING UNSCHEDULED D-CACHE MISS PIPELINE STALLS IN A CASCADED DELAYED EXECUTION PIPELINE

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,145

(22) Filed: Jul. 2, 2008

(65) Prior Publication Data

US 2008/0276079 A1 Nov. 6, 2008

Related U.S. Application Data

(63) Continuation of application No. 11/351,247, filed on Feb. 9, 2006, now Pat. No. 7,447,879.

(51) Int. Cl.
*G06F 9/30* (2006.01)
(52) U.S. Cl. ...................................... 712/219; 712/215
(58) Field of Classification Search .................... 712/23, 712/215, 216, 219, 225
See application file for complete search history.

(56) References Cited

U.S. PATENT DOCUMENTS 5,598,546 A 1/1997 Blomgren
5,922,065 A 7/1999 Hull et al.
6,081,872 A 6/2000 Matick et al.
6,389,529 B1 5/2002 Arimilli et al.
6,622,235 B1 9/2003 Keller et al.
6,769,057 B2 7/2004 Steely, Jr.
6,912,648 B2 6/2005 Hammarlund et al.
7,136,992 B2 11/2006 Maiyuran et al.
2007/0186080 A1 8/2007 Luick

OTHER PUBLICATIONS

Shen, et al. "Modern Processor Design—Fundamentals of Superscalar Processors," 2004, p. 185.
Ozawa, Motokazu et al, "A Cascade ALU Architecture for Asynchronous Super-Scalar Processors", Feb. 2001, IEICE Trans. Electron, vol. E84-C, No. 2, pp. 229-237.
Yoaz, Adi et al, "Speculation Techniques for Improving Load Related Instruction Scheduling", IEEE, 1999, pp. 42-53.
Hennessy, John L. et al, "Computer Architecture—A Quantitative Approach", 2003, Morgan Kaufmann Publishers, Third Edition, pp. 196-199.

*Primary Examiner*—David J Huisman
(74) *Attorney, Agent, or Firm*—Patterson & Sheridan LLP

(57) ABSTRACT

A method and apparatus for minimizing unscheduled D-cache miss pipeline stalls is provided. In one embodiment, execution of an instruction in a processor is scheduled. The processor may have at least one cascaded delayed execution pipeline unit having two or more execution pipelines that execute instructions in a common issue group in a delayed manner relative to each other. The method includes receiving an issue group of instructions, determining if a first instruction in the issue group is a load instruction, and if so, scheduling the first instruction to be executed in a pipeline in which execution is not delayed with respect to another pipeline in the cascaded delayed execution pipeline unit.

10 Claims, 13 Drawing Sheets

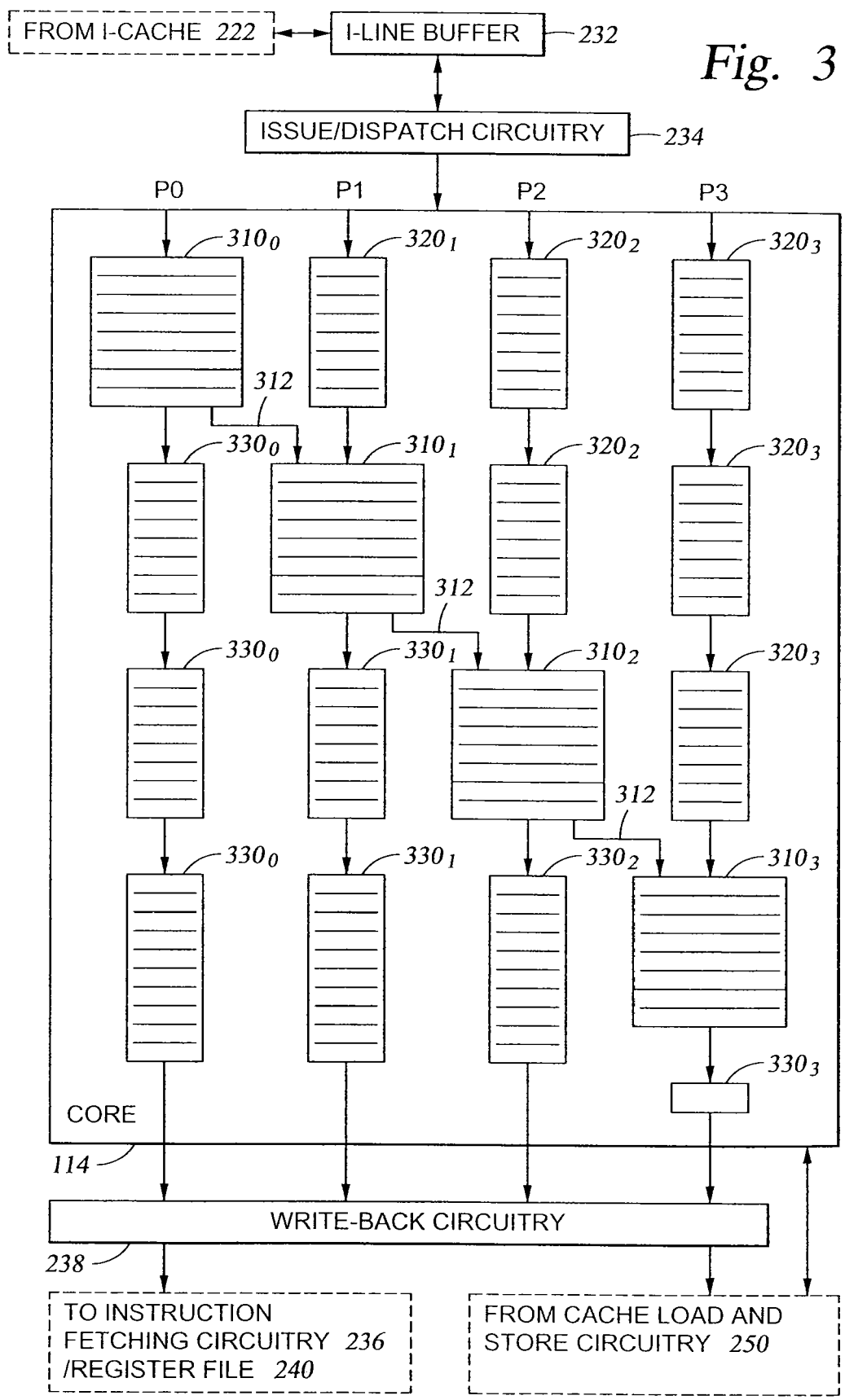

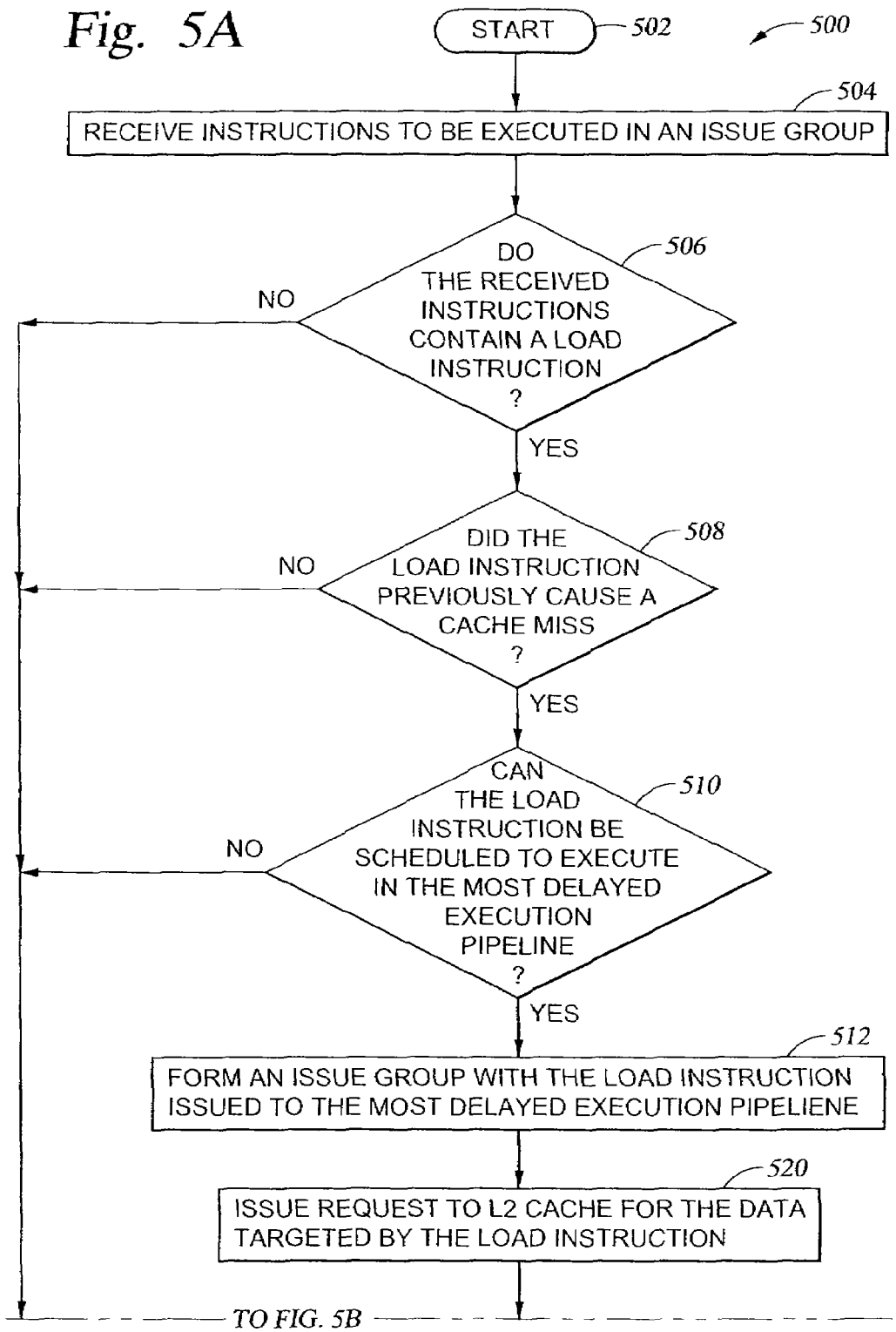

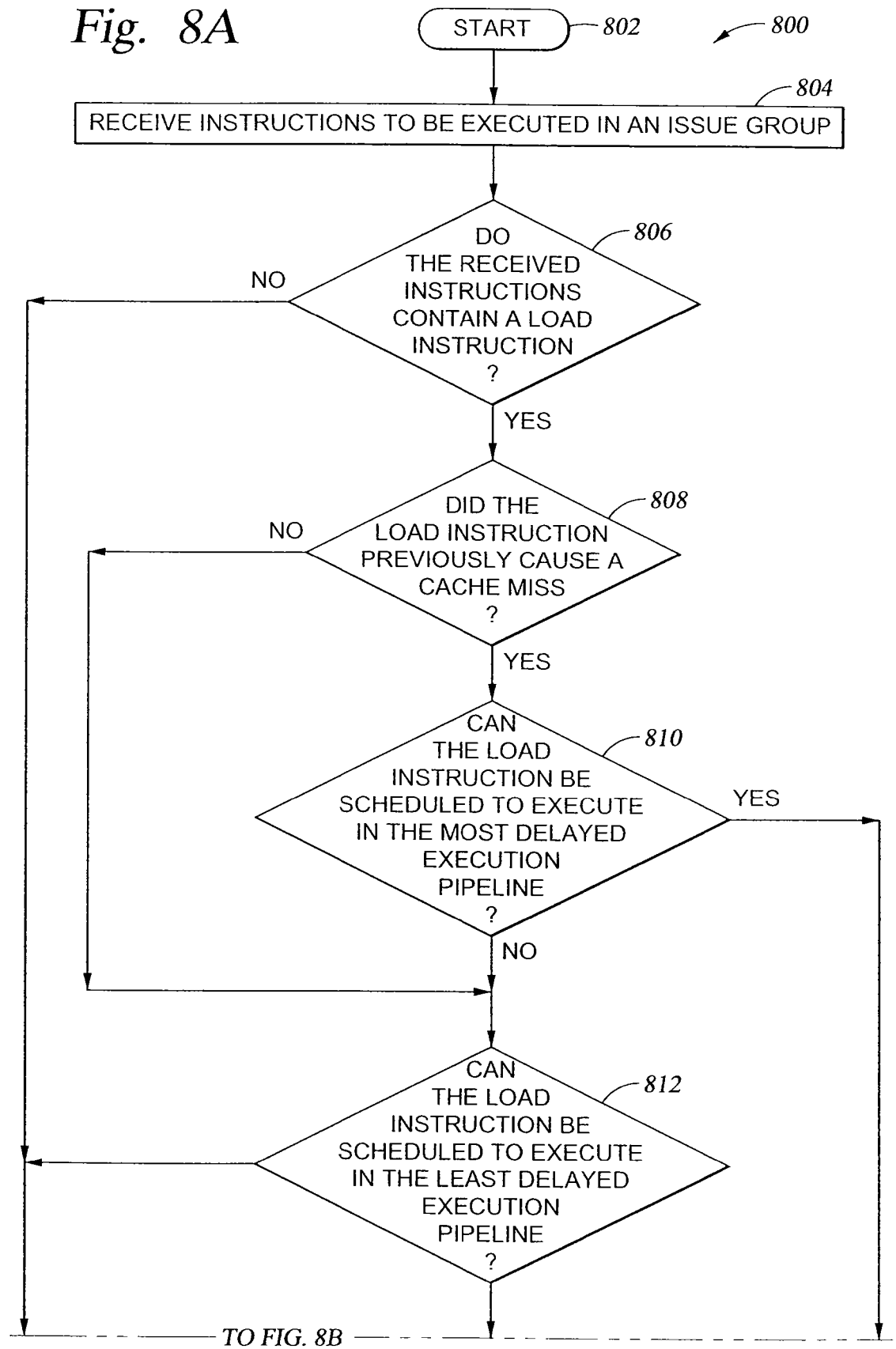

MINIMIZING UNSCHEDULED D-CACHE MISS PIPELINE STALLS IN A CASCADED DELAYED EXECUTION PIPELINE

CROSS-REFERENCE TO RELATED APPLICATIONS

This application is a continuation of U.S. patent application Ser. No. 11/351,247, now U.S. Pat. No. 7,447,879, filed Feb. 9, 2006, which is herein incorporated by reference in its entirety.

BACKGROUND OF THE INVENTION

1. Field of the Invention

The present invention generally relates to executing instructions in a processor. Specifically, this application is related to minimizing pipeline stalls in a processor due to cache misses.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache). In some cases, the processor may have other, additional cache levels (e.g., an L3 cache and an L4 cache).

To provide the processor with enough instructions to fill each stage of the processor's pipeline, the processor may retrieve instructions from the L2 cache in a group containing multiple instructions, referred to as an instruction line (I-line). The retrieved I-line may be placed in the L1 instruction cache (I-cache) where the core of the processor may access instructions in the I-line. Blocks of data (D-lines) to be processed by the processor may similarly be retrieved from the L2 cache and placed in the L1 cache data cache (D-cache).

The process of retrieving information from higher cache levels and placing the information in lower cache levels may be referred to as fetching, and typically requires a certain amount of time (latency). For instance, if the processor core requests information and the information is not in the L1 cache (referred to as a cache miss), the information may be fetched from the L2 cache. Each cache miss results in additional latency as the next cache/memory level is searched for the requested information. For example, if the requested information is not in the L2 cache, the processor may look for the information in an L3 cache or in main memory.

In some cases, a processor may process instructions and data faster than the instructions and data are retrieved from the caches and/or memory. For example, where an instruction being executed in a pipeline attempts to access data which is not in the D-cache, pipeline stages may finish processing previous instructions while the processor is fetching a D-line which contains the data from higher levels of cache or memory. When the pipeline finishes processing the previous instructions while waiting for the appropriate D-line to be fetched, the pipeline may have no instructions left to process (referred to as a pipeline stall). When the pipeline stalls, the processor is underutilized and loses the benefit that a pipelined processor core provides.

Because the address of the desired data may not be known until the instruction is executed, the processor may not be able to search for the desired D-line until the instruction is executed. However, some processors may attempt to prevent such cache misses by fetching a block of D-lines which contain data addresses near (contiguous to) a data address which is currently being accessed. Fetching nearby D-lines relies on the assumption that when a data address in a D-line is accessed, nearby data addresses will likely also be accessed as well (this concept is generally referred to as locality of reference). However, in some cases, the assumption may prove incorrect, such that data in D-lines which are not located near the current D-line are accessed by an instruction, thereby resulting in a cache miss and processor inefficiency.

Accordingly, there is a need for improved methods and apparatuses for executing instructions and retrieving data in a processor which utilizes cached memory.

SUMMARY OF THE INVENTION

The present invention generally provides improved methods and apparatuses for executing instructions and retrieving data in a processor which utilizes cached memory. In one embodiment, a method of scheduling execution of an instruction in a processor is provided. The processor may have at least one cascaded delayed execution pipeline unit having two or more execution pipelines that execute instructions in a common issue group in a delayed manner relative to each other. The method includes receiving an issue group of instructions, determining if a first instruction in the issue group is a load instruction, and if so, scheduling the first instruction to be executed in a pipeline in which execution is not delayed with respect to another pipeline in the cascaded delayed execution pipeline unit.

Another embodiment of the invention provides an integrated circuit device comprising a cascaded delayed execution pipeline unit having two or more execution pipelines that execute instructions in a common issue group in a delayed manner relative to each other. The integrated circuit device also includes circuitry configured to receive an issue group of instructions, determine if a first instruction in the issue group is a load instruction, and if so, schedule the first instruction to be executed in a pipeline in which execution is not delayed with respect to another pipeline in the cascaded delayed execution pipeline unit.

Yet another embodiment of the invention provides a processor comprising a level two cache, a level one cache, and a cascaded delayed execution pipeline unit having two or more execution pipelines that execute instructions in a common issue group in a delayed manner relative to each other. The processor also includes predecoder circuitry configured to receive from the level two cache a group of instructions to be issued as an issued group, determine if a first instruction in the group of instructions is a load instruction, if so, schedule the first instruction to be executed in a pipeline in which execution is not delayed with respect to another pipeline in the cascaded delayed execution pipeline unit, and send the group of instructions to the level one cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a block diagram depicting one of the cores of the processor according to one embodiment of the invention.

FIGS. 5A-B depict a process for using D-cache miss prediction to schedule the execution of load instructions according to one embodiment of the invention.

FIGS. 8A-C depict a process for using D-cache miss information to determine the scheduling of a load instruction according to one embodiment of the invention.

DETAILED DESCRIPTION OF THE PREFERRED EMBODIMENTS

Figure 1:
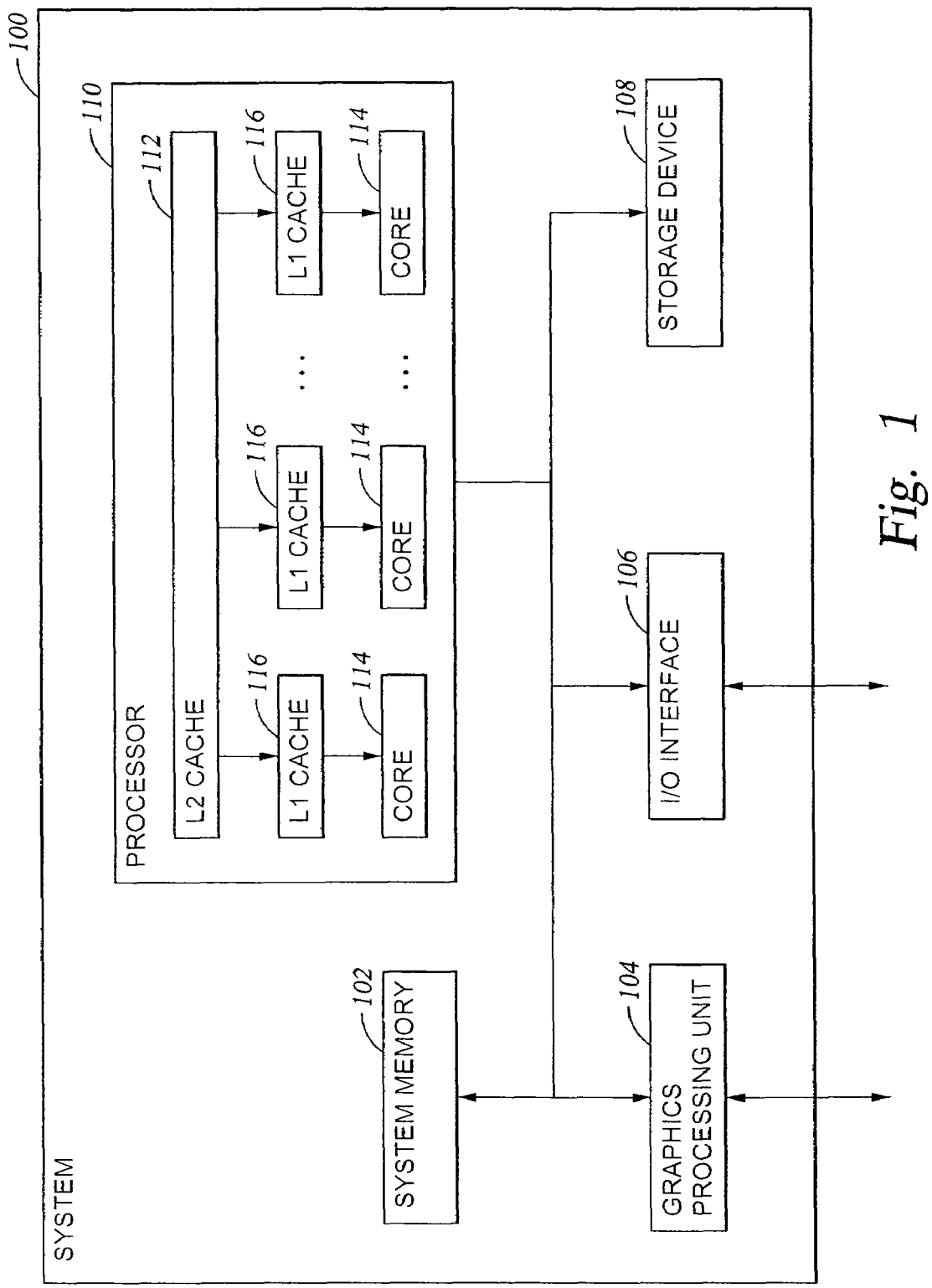
FIG. 1 is a block diagram depicting a system according to one embodiment of the invention.

The present invention generally provides a mechanism to minimize unscheduled D-cache miss pipeline stalls. In one embodiment, a method of scheduling execution of an instruction in a processor is provided. The processor may have at least one cascaded delayed execution pipeline unit having two or more execution pipelines that execute instructions in a common issue group in a delayed manner relative to each other. The method includes receiving an issue group of instructions, determining if a first instruction in the issue group is a load instruction, and if so, scheduling the first instruction to be executed in a pipeline in which execution is not delayed with respect to another pipeline in the cascaded delayed execution pipeline unit. By executing the instruction in the pipeline in which execution is not delayed, a determination may be quickly made of whether executing the instruction results in a cache miss. If the instruction results in a cache miss, then a request for the data from higher levels of cache and/or memory may be initiated more quickly (e.g., than if the instruction were executed in a pipeline with a greater delay in execution).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache divided into an L1 instruction cache (L1 I-cache, or I-cache) and an L1 data cache (L1 D-cache, or D-cache 224), embodiments of the invention may be utilized in configurations wherein a unified L1 cache is utilized.

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
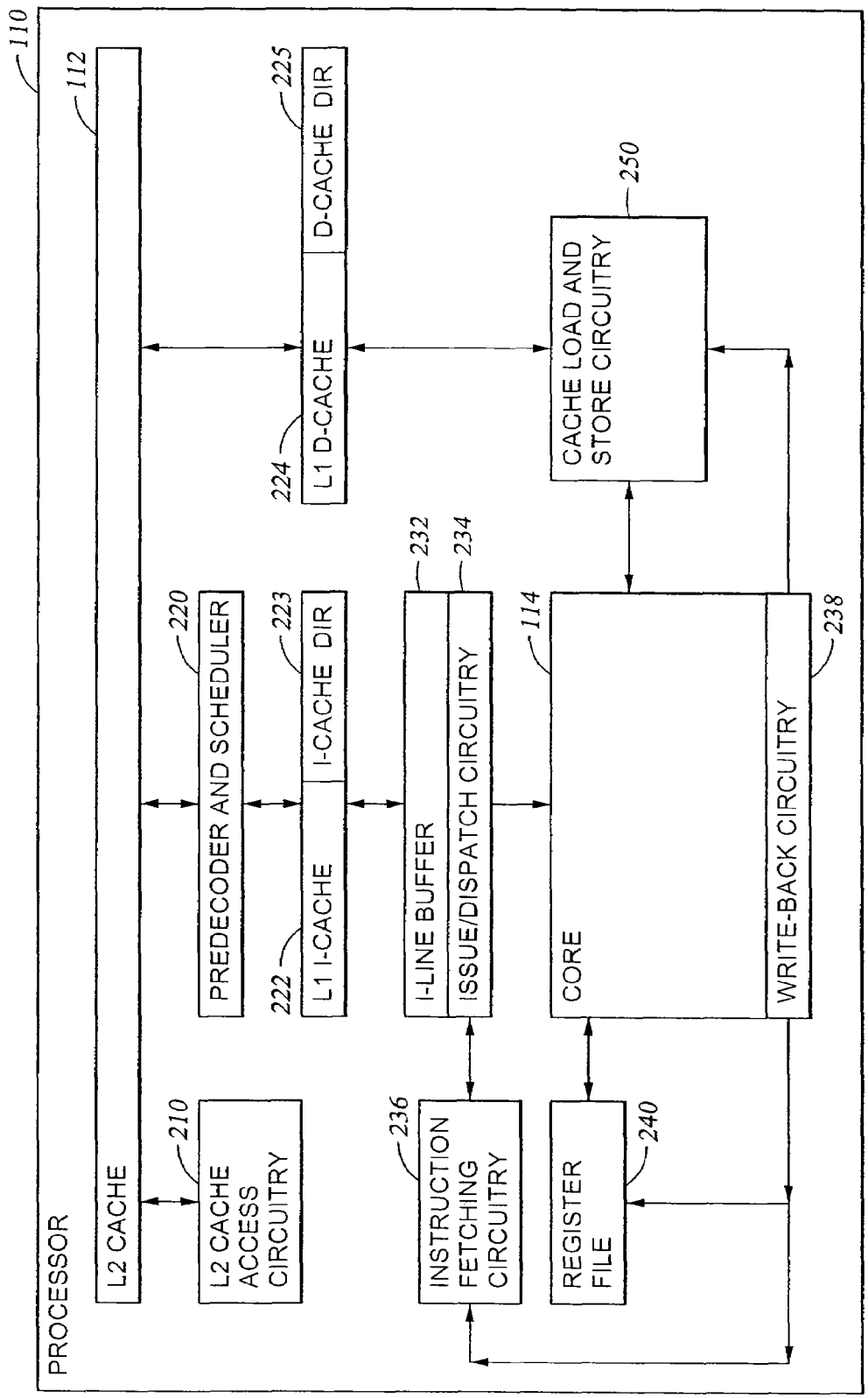
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220 (described below in greater detail).

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 220 may be shared among multiple cores 114 and L1 caches. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core. A branch unit within the core may be used to change the program counter when a branch instruction is encountered. An I-line buffer 232 may be used to store instructions fetched from the L1 I-cache 222. Issue and dispatch circuitry 234 may be used to group instructions retrieved from the I-line buffer 232 into instruction groups which may then be issued in parallel to the core 114 as described below. In some cases, the issue and dispatch circuitry may use information provided by the predecoder and scheduler 220 to form appropriate instruction groups.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In one embodiment, upon issuing the issue group to the processor core 114, may be executed immediately in execution unit $310_0$. Later, after instruction I0 has finished being executed in execution unit $310_0$, execution unit $310_1$ may begin executing instruction I1, and so on, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

Scheduling Load Instructions

According to one embodiment of the invention, pipeline stalls due to cache misses may be reduced by executing load instructions in the least delayed pipeline (e.g., in the example described above, in pipeline $P_0$). Where the load instruction results in a D-cache miss, instructions issued after the load instruction may be invalidated and a request for data may be sent to the L2 cache 112. While the desired data is being fetched from the L2 cache 112, the load instruction may be reissued to the pipeline (e.g., pipeline P3) with the greatest delay in execution, and the invalidated instructions may be issued, either in the same issue group with the reissued instruction or in subsequent issue groups.

Executing the load instruction as described above may be beneficial in at least three respects. First, by initially executing the load instruction in the pipeline with the least delay in execution, a determination may be made quickly of whether the load instruction results in a D-cache miss. With an early determination of whether a D-cache miss results, fewer instructions issued to the pipeline (e.g., instructions in subsequent issue groups) may be invalidated and reissued. Second, by quickly determining whether the issued instruction results in an L1 cache miss, an L2 cache access may be initiated more quickly, thereby reducing any resulting stall in the pipeline while the L2 cache access is performed. Third, by reissuing the load instruction to the pipeline with the greatest delay, more time (e.g., while the load instruction is being moved through the delay queue 320 and before the instruction is re-executed by an execution unit 310) may be provided for the L2 cache access of the desired data to be completed, thereby preventing a stall of the processor core 114.

Figure 4A:
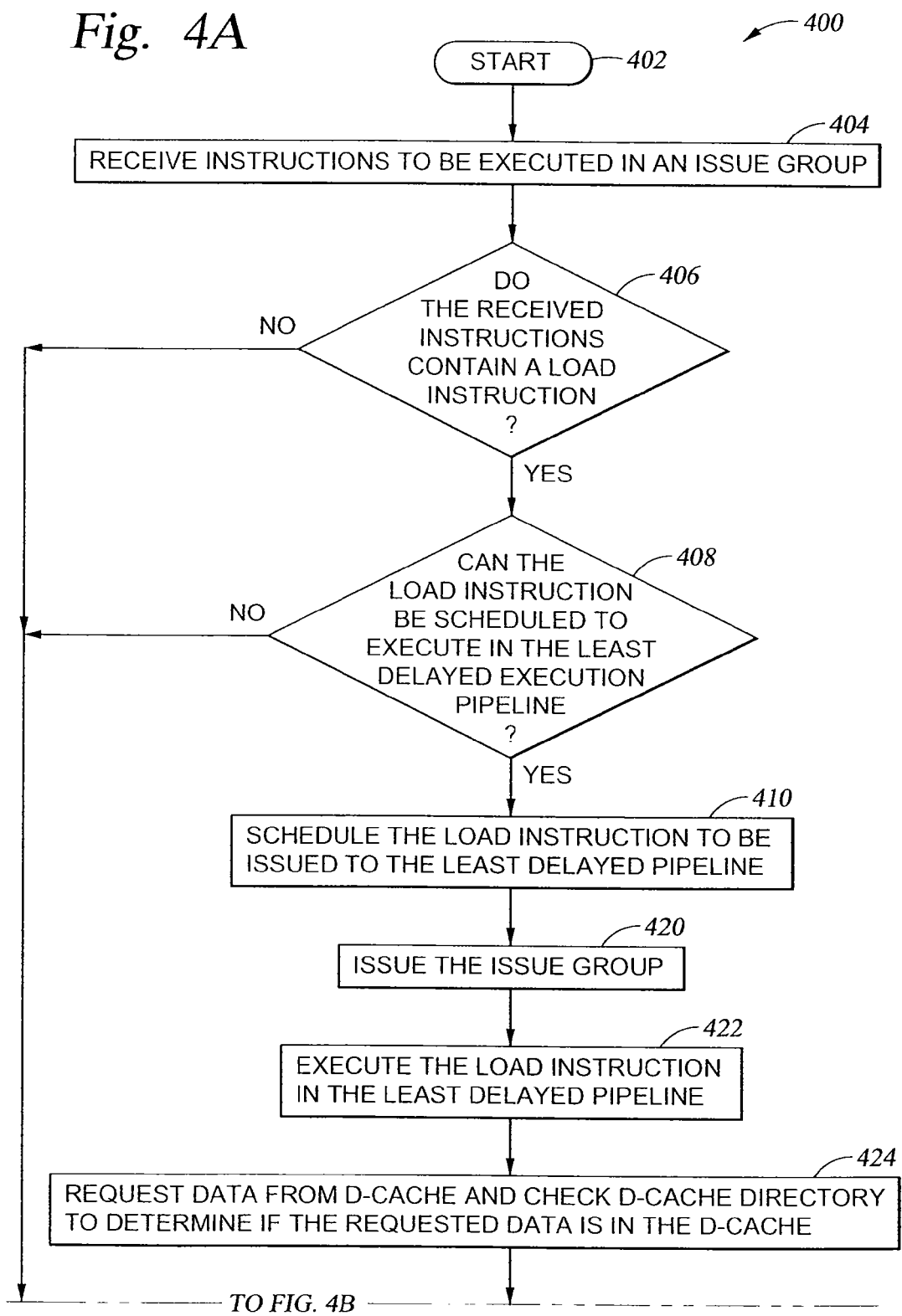
FIGS. 4A-B depict a process for executing instructions in the delayed execution pipeline according to one embodiment of the invention.
Figure 4B:
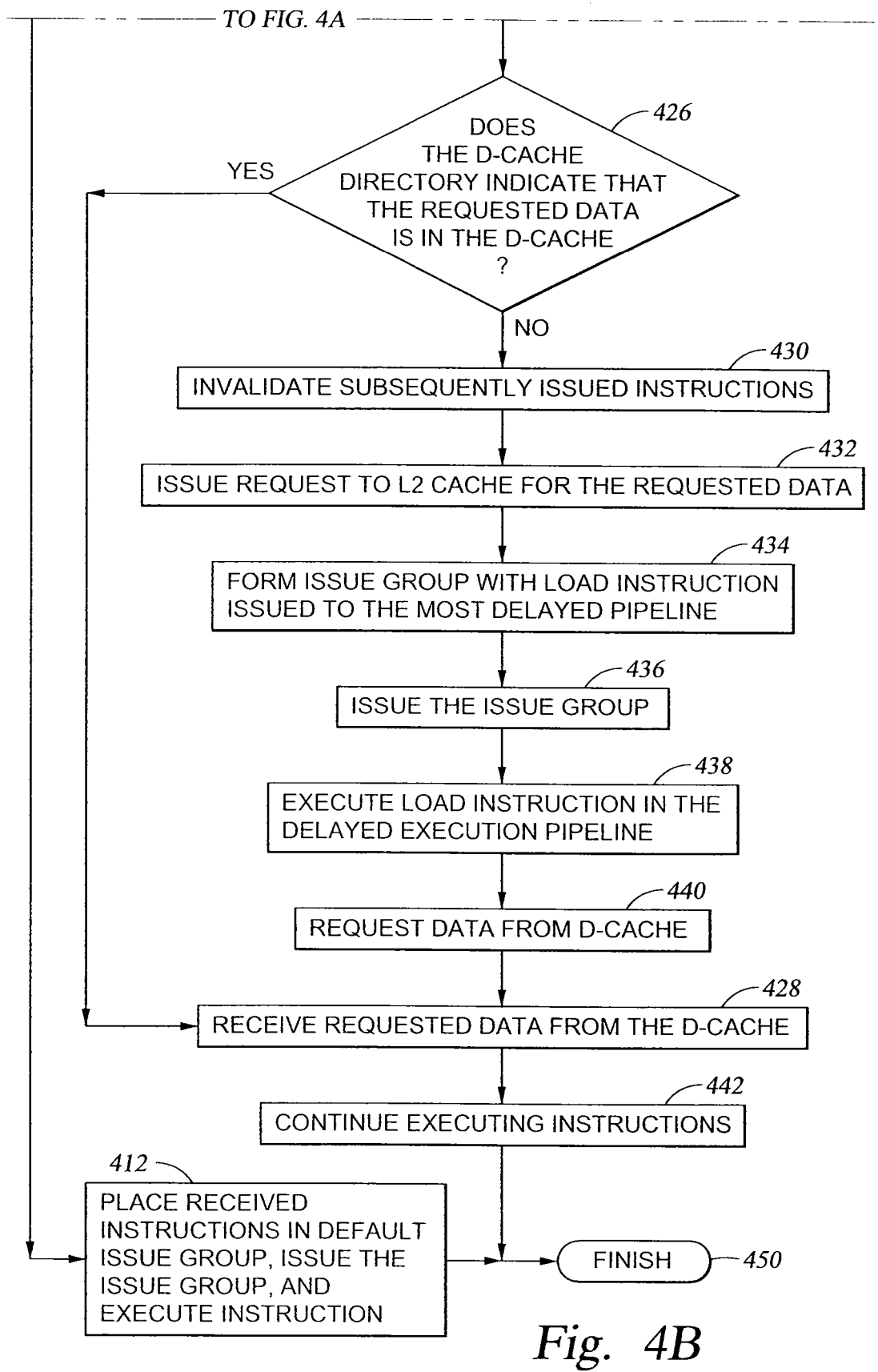

FIGS. 4A-B depict a process 400 for executing instructions in the delayed execution pipeline according to one embodiment of the invention. The process 400 may begin at step 402 and continue to step 404 where instructions to be executed in an issued group are received.

At step 406, a determination may be made of whether the received instructions contain a load instruction. If the received instructions do not contain a load instruction, the instructions may be placed in a default issue group, issued to the processor core 114 and executed at step 412. If, however, the received instructions do contain a load instruction, a determination may be made at step 408 of whether the load instruction can be issued within an instruction group to the least delayed pipeline. For example, where the least delayed pipeline is the only pipeline in the processor core 114 which performs a function required by another instruction (e.g., if the least delayed pipeline is the only pipeline which can execute a branch instruction), the load instruction may be issued to another pipeline with more delay. Also, in some cases, execution of the load instruction may be dependent on the outcome of other executed instructions. For example, the memory address of the data targeted by the load instruction may be dependent on a calculation performed by another instruction. Where the load instruction is dependent on another instruction in the same issue group, the other instruction may be executed before the load instruction, e.g., using a pipeline with less delay in execution. Optionally, in some cases, the instructions in the issue group may be scheduled (e.g., by spreading the instructions across multiple issue groups) so that such dependencies in a single issue group are avoided.

If a determination is made that the load instruction can be issued within an issue group to the least delayed pipeline, the load instruction may be scheduled to be issued to the least delayed pipeline (e.g., pipeline $P_0$) at step 410. At step 420, the issue group may be issued to the processor core 114, and at step 422, the load instruction may be executed in the least delayed pipeline.

At step 424, data for the load instruction may be requested from the D-cache 224 and the D-cache directory 225 may be checked to determine whether a D-line containing the requested data is located in the D-cache 225. Because the load instruction is executed in the least delayed pipeline, the cache access may be initiated sooner than if the load instruction were executed in a pipeline with more delay (e.g., pipeline $P_1$, $P_2$, or $P_3$).

A determination may be made at step 426 of whether the D-cache 224 contains the requested data. The determination may be made, for example, based on the information provided by the D-cache directory 225. If the D-cache 224 does contain the requested data, the requested data may be received from the D-cache 224 at step 428 and at step 442 the process 400 may continue executing instructions.

If, however, the D-cache 224 does not contain the requested data, instructions issued to the processor core 114 after the load instruction (e.g., instructions in subsequent issue groups) may be invalidated at step 430. Invalidating subsequently issued may be performed, for example, to prevent improper execution of later instructions which may depend on the outcome of the load instruction. In one embodiment, invalidation of instructions may be performed by setting a bit for each subsequently issued instruction in the processor core 114 (e.g., for subsequently issued instructions in an execution unit 310 or delay queue 320). The bit may indicate that results produced by the instructions are invalid. When the bit is detected, for instance, by the write-back circuitry 238, the results produced by the invalidated instructions may be discarded. Optionally, the instructions may be removed from the processor core by overwriting the instructions. In one embodiment, after the instructions (including the load instruction) are invalidated, the cache miss may be recorded for later use in scheduling (described below in greater detail) and the invalidated instructions may be returned to the I-cache 222 so that the instructions may be reissued to the processor core 114.

At step 432, a request may be issued to the L2 cache for the requested data. For example, the request may be issued using the L2 access circuitry 210. In some cases, the request may be issued automatically after the D-cache directory 225 indicates that the requested data is not in the D-cache 224.

At step 434, an issue group with the load instruction issued to the most delayed pipeline (e.g., pipeline $P_3$) may be formed. At step 436, the issue group may be issued to the processor core 114, and at step 438, after being delayed in a delay queue (e.g., delay queue $320_3$), the load instruction may be executed in the delayed execution pipeline $P_3$. As described above, by executing the instruction to the most delayed pipeline, the L2 cache access may be completed before the instruction is executed (e.g., the L2 cache access may continue while the instruction is moving through the delay queue $320_3$) and the data for the load instruction may arrive "just in time" to execute the load instruction.

At step 440, the data for the load instruction may be requested from the D-cache 224. Assuming the L2 cache 112 contains the requested data, the requested data will be received from the D-cache 224 at step 428, the processor core 114 may continue executing instructions at step 442, and the process 400 may finish at step 450.

In some cases, after an access request is sent to the L2 cache 112 and the load instruction is reissued to be executed in the most delayed pipeline, the L2 cache 112 may not contain the requested data. Where the L2 cache 112 does not contain the requested data, the processor core 114 may stall while an access request is made to higher levels of cache memory (e.g., an L3 or L4 cache) and/or the system memory 102. When the requested data is received from the D-cache, the processor core 114 may resume execution of the load instruction and any subsequently received load instructions.

In some cases, the least delayed pipeline (or, where desired, the most delayed pipeline) may not be available to execute a load instruction as desired. In one embodiment, where a pipeline with a desired amount of delay is not available, the load instruction may be scheduled to be executed in a "next best" choice of pipeline. For example, where the pipeline $P_0$ with the least amount of delay is not available for executing an instruction, the instruction may be scheduled to be executed in the next available pipeline with the least amount of delay (e.g., in order of preference, pipelines $P_1$, $P_2$, or $P_3$).

As describe above, by executing a load instruction in the pipeline with the least amount of delay, a reduced number of instructions may be invalidated if the load instruction results in a cache miss. Furthermore, by reissuing a load instruction which results in a cache miss to the most delayed pipeline, execution of the instruction may be postponed until a cache access to a higher level of cache memory has been completed. As described below, where prediction and history information is used to predict that an instruction may cause a cache miss, other optimizations in instruction scheduling and executing may also be performed.

Using D-Cache Miss Prediction to Schedule Load Instructions

In some cases, cache miss prediction and history information may be used to change which pipeline (in a cascaded, delayed execution pipeline core) an instruction is scheduled to be executed in. For example, in one embodiment, a group of instructions to be issued may be received. If an instruction in the group resulted in a cache miss during a previous execution of the instruction, the instruction may be scheduled to be executed in a pipeline in which execution is delayed with respect to another pipeline in the delayed execution pipeline unit. By scheduling the instruction to be executed in a delayed pipeline, execution of the load instruction may be postponed while an access to a higher level of cache (e.g., resulting from a D-cache miss, if any), is performed.

Figure 5B:
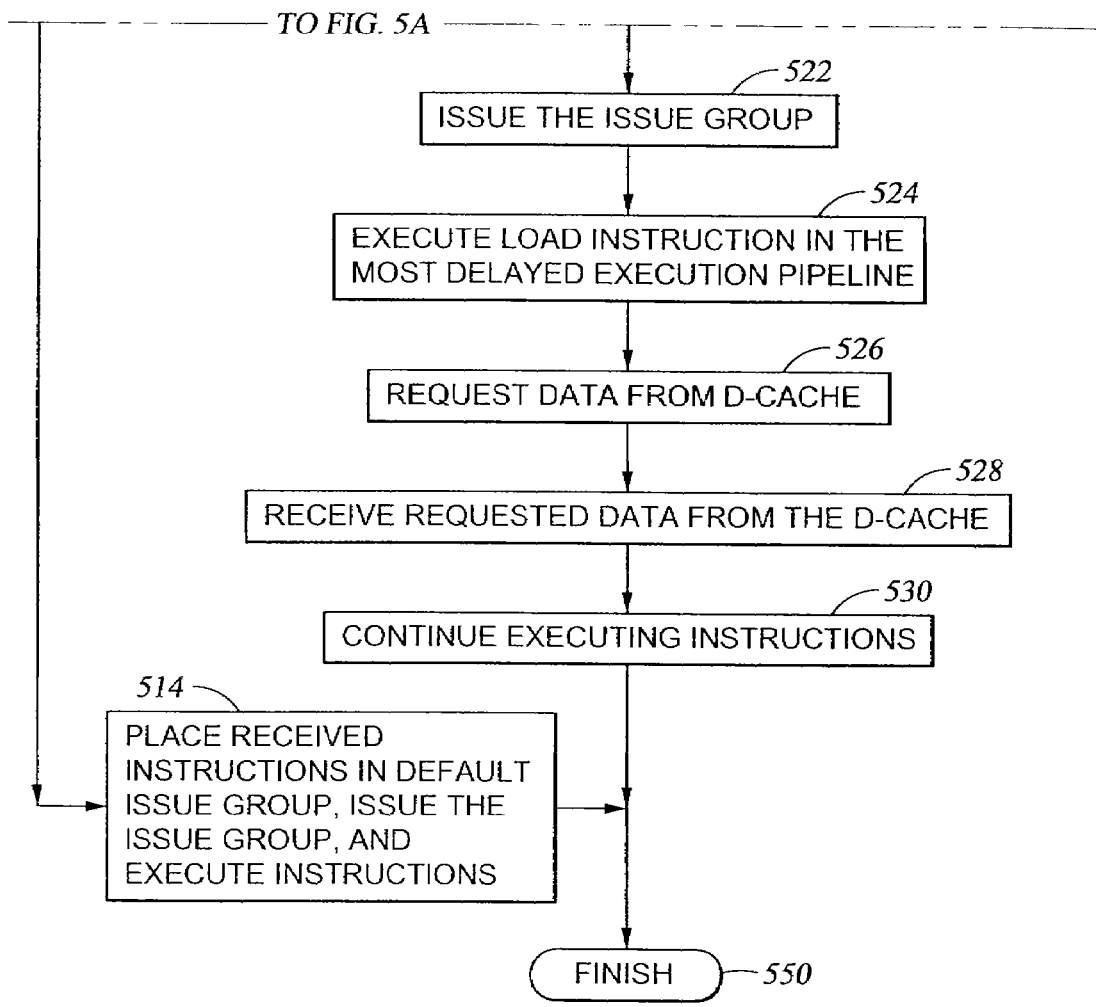

FIGS. 5A-B depict a process 500 for using D-cache miss prediction to schedule the execution of load instructions according to one embodiment of the invention. The process 500 may begin at step 502 and continue to step 504 where instructions to be executed in an issue group are received. At step 506, a determination may be made of whether the received instructions contain a load instruction. If not, the received instructions may be placed in a default issue group, issued to the processor core 114, and executed at step 514.

If the received instructions do contain a load instruction, a determination may be made at step 508 of whether the load instruction previously caused a cache miss. In one embodiment, the determination of whether the load instruction previously caused a D-cache miss may be made using D-cache miss information (e.g., bits which record a history of previous D-cache misses). As described below, the D-cache miss information may be stored and maintained in the instruction itself, in a part of the instruction line with the instruction, in a special memory for storing such information, and/or any other suitable location.

If the received load instruction previously caused a D-cache miss, a determination may be made at step 510 of whether the load instruction can be scheduled to be executed in the most delayed execution pipeline. As described above, the determination of whether an instruction can be executed in a given pipeline may depend on the processing capabilities of the pipeline, the processing needs of the instructions being executed, and the inter-instruction dependencies of the instructions being placed in an issue group. Also, as described above, in some cases, to allow an instruction to be issued to the most delayed pipeline (or least delayed, where desired) issue groups may be modified by issuing incompatible instructions in separate issue groups or by otherwise modifying which issue groups execute which instructions.

If the load instruction can be scheduled to execute in the delayed execution pipeline, an issue group may be formed at step 512 with the load instruction scheduled to be issued to the delayed execution pipeline (e.g., pipeline $P_3$). Optionally, where possible, the instruction may be scheduled to be executed in an available pipeline which provides the largest amount of delay available.

At step 520, a request may be issued to the L2 cache 112 for the data targeted by the load instruction. The request may be issued, for example, using the L2 cache access circuitry 210. As described below, in some cases the L2 cache access may be initiated before the load instruction has been executed. Optionally, in some cases, a portion of the load instruction may be executed (e.g., a load effective address for the load instruction may be calculated), and execution of the load instruction may then be delayed while the load data is fetched from the L2 cache 112.

At step 522, the issue group may be issued to the processor core 114 and at step 524 the load instruction may be executed in the most delayed execution pipeline. When the load instruction is executed, the data targeted by the load instruction may be requested from the D-cache 224 at step 526. If the request issued to the L2 cache at step 520 is successful, the requested data from the D-cache 224 may be received at step 528. Optionally, as described above, if the L2 cache 112 does not contain the requested data, the processor core 114 may stall while the requested data is fetched from higher levels of cache and/or memory. However, because the execution of the load instruction is delayed, the length of the stall may be reduced. After the requested data is received, instructions may continue being executed at step 530 and the process 500 may finish at step 550.

As described above, when a determination is made that the load instruction previously caused a cache miss, the load instruction may be issued to the most delayed pipeline available and a request may be issued to the L2 cache 112 for the load data. While the load instruction is delayed (e.g., in a delay queue 320), the L2 access may be performed such that the load data arrives in the D-cache 224 in time to be accessed by the load instruction.

In order to perform the L2 cache access, the effective address of the load instruction may be determined early (e.g., before the load instruction is delayed, for example, by placing the load instruction in a delay queue 320). Thus, in one embodiment, the L2 access may be initiated before the instruction is issued to the processor core 114 or executed. For example, when the load instruction is retrieved from the L2 cache 112, the predecoder and scheduler 220 may determine whether the load instruction previously resulted in a D-cache miss and if so, initiate the L2 cache access. Where the L2 access is initiated before the instruction is executed, the L2 access may be referred to as a prefetch (because the targeted data is fetched before execution of the instruction).

In one embodiment of the invention, the target address of data requested by a load instruction may be determined while the predecoder and scheduler 220 is decoding the load instruction. For example, the target address may be provided directly as part of the instruction. Optionally, the target address may be preresolvable, e.g., using information available to the predecoder and scheduler 220 or other circuitry used to initiate an L2 cache access. In another embodiment, the target address of the data requested by the load instruction may be calculated during a first execution of the instruction. The calculated address may then be stored for subsequent use in initiating an L2 cache access.

In one embodiment, where a target address is stored, the entire target address of the requested data may be stored. Optionally, in one embodiment, where a target address is stored, only a portion of the target address may be stored (e.g., enough address bits of the target address to identify a D-line containing the requested data). For instance, if a cached D-line containing the requested data of the load instruction may be located using only the higher-order 32 bits of an effective address, then only those 32 bits may be saved as the target address for purposes of prefetching the D-line.

Figure 6:
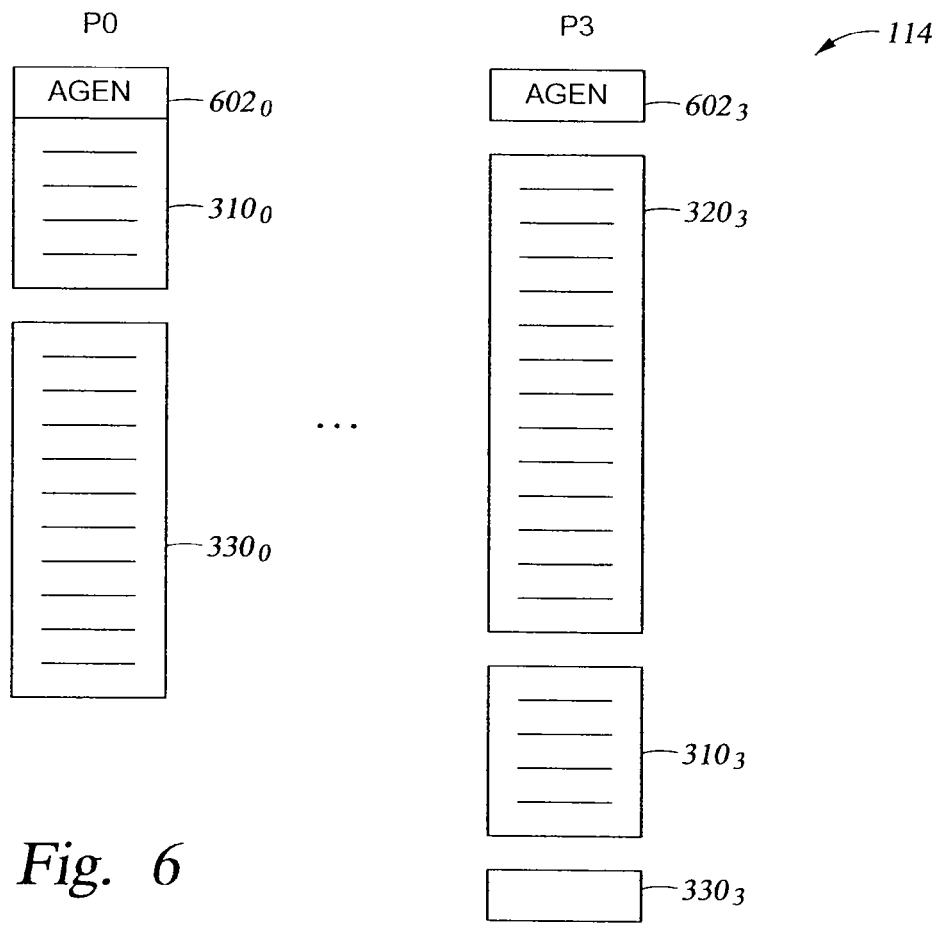
FIG. 6 is a block diagram depicting an exemplary delayed execution processor pipeline with an early address generation stage according to one embodiment of the invention.

In one embodiment of the invention, the load target address may be calculated after the load instruction has been issued to the processor core, but before the load instruction is placed in a delay queue 320 or completely executed by an execution unit 310. For example, as depicted in FIG. 6, each pipeline may utilize a stage for address generation (AGEN) $602_0$, $602_3$. For non-delayed or lesser-delayed pipeline, the AGEN stage $602_0$ may be performed as a first stage of the execution unit $310_0$. However, in the most-delayed pipeline P3 (or other pipelines with larger delays), the AGEN stage $602_3$ may be performed at the beginning of the pipeline, before the instruction is delayed (e.g., in delay queue $320_3$) and before the instruction is executed (e.g., in execution unit $310_3$). By performing the address generation at the beginning of the delayed pipeline, the load effective address may be quickly determined and an L2 cache access may be initiated and performed while the load instruction is delayed in the delay queue 320. Then, the data from the L2 cache 112 may arrive in time to complete execution of the load instruction in the execution unit $310_3$.

As mentioned above, in one embodiment, D-cache miss information may be used to determine if a load instruction previously caused a D-cache miss. Where the D-cache miss information indicates that an instruction previously caused a D-cache miss, the instruction may be scheduled for execution in a delayed pipeline as described above.

In one embodiment, the D-cache miss information may include a single bit (the MIS bit) which is set for a load instruction when the load instruction results in a D-cache miss. Initially, before the instruction has been executed, the MIS bit may be cleared, thereby indicating that the instruction has not previously caused a D-cache miss. Later, when the instruction is executed, a determination may be made of whether the instruction results in a D-cache miss. If the instruction results in a D-cache miss, the MIS bit may be set, thereby indicating that the instruction has previously resulted in a D-cache miss. When the load instruction is subsequently retrieved for execution (e.g., from the L2 cache 112), the stored MIS bit may be examined, e.g., using the predecoder and scheduler 220. If the MIS bit is set, the predecoder and scheduler 220 may predict that the load instruction will result in another D-cache miss. Thus, as described above with respect to FIGS. 5A-B, an L2 cache access may be initiated using the target address of the load instruction and the load instruction may be scheduled for execution in the most-delayed pipeline available.

In some cases, if the load instruction is executed later and does not result in a D-cache miss, MIS may be cleared to a 0, indicating that the load instruction may not subsequently result in a D-cache miss. Optionally, MIS may remain set to 1 (e.g., as a sticky bit), thereby indicating that the load instruction has previously caused a D-cache miss and may possibly result in another D-cache miss.

In some cases, where the MIS bit is set and requested data is successfully retrieved from the D-cache, it may be useful to determine how the data was placed in the D-cache. For example, in some cases, a D-cache miss may be avoided because the MIS bit was used to prefetch the data. Optionally, in some cases, a D-cache miss may be avoided without prefetching the data (e.g., the data may already be in the D-cache, and the L2 access may be unnecessary). In one embodiment, a bit may be stored to indicate whether data (e.g., in a D-line) is placed in the D-cache 224 because of a prefetch based on a set MIS bit. The bit may be used by the processor 110 to determine the effectiveness of a prefetch in preventing a D-cache miss.

Optionally, the predecoder and scheduler 220 (or optionally, the prefetch circuitry) may also determine that prefetches are unnecessary and change the MIS bit in the I-line accordingly. Where a prefetch is unnecessary, e.g., because the data being prefetched is already in the D-cache 224 the MIS bit may be cleared as described above. The predecoder and scheduler may determine whether the requested data is in the D-cache 224, for example, by checking the D-cache directory 225 or by maintaining a list of fetched data and/or D-lines.

In one embodiment of the invention, multiple history bits (HIS) may be used to predict whether a load instruction will result in a D-cache miss and determine how a load instruction should be scheduled for execution. For instance, if HIS is two binary bits, 00 may correspond to no prediction of a D-cache miss, whereas 01, 10, and 11 may correspond to weak, strong, and very strong predictions of D-cache misses, respectively. Each time a load instruction results in a D-cache miss, HIS may be incremented, increasing the prediction level for a D-cache miss. When HIS is 11 and a subsequent D-cache miss is detected, HIS may remain at 11 (e.g., the counter may saturate at 11 instead of looping to 00). Each time a load instruction does not result in a D-cache miss, HIS may be decremented. In some cases, where multiple history bits are utilized, the multiple history bits may be used both to determine which data addresses should be stored and also to determine how to schedule the load instruction.

As described above, the D-cache miss information and target address may be used to determine whether to initiate an L2 cache access. In some cases, an L2 cache access may be performed without first checking the D-cache 224 and/or D-cache directory 225 to determine whether the data targeted by a load instruction is actually in the D-cache. For example, in some cases, the L2 cache access may be initiated before a request is initiated to the D-cache directory 255. After the L2 cache access is initiated, a request may be issued to the D-cache directory 225 (e.g., using the L2 cache access circuitry 210). If the D-cache directory indicates that the D-cache 224 does not contain the requested data, the L2 access may continue. Where the L2 cache access is initiated first and a request is subsequently issued to the D-cache directory 225, the L2 access may be completed in a reduced amount of time because the L2 access was initiated without waiting for the results for the request to the D-cache directory 225. If the D-cache directory 225 indicates that the requested data is contained in the D-cache 224, the results of the L2 cache access may be discarded while the requested data is accessed via the D-cache 224.

Optionally, in some cases, before the predecoder and scheduler 220 attempts to prefetch an I-line or D-line from the L2 cache 112, the predecoder and scheduler 220 (or, optionally, other prefetch circuitry) may determine if the D-line containing the requested data is already contained in the D-cache 224, or if a prefetch request for the requested I-line or D-line has already been issued. For example, a small cache or buffer containing a history of recently fetched or prefetched I-line or D-line addresses may be used to determine if a prefetch request has already been issued for an I-line or D-line or if a requested I-line or D-line is already in the I-cache 222 or the D-cache 224.

If the requested I-line or D-line is already located in the I-cache 222 or the D-cache 224, an L2 cache prefetch may be unnecessary and may therefore not be performed. As described above, where a second prefetch request is rendered unnecessary by previous prefetch request, the stored D-cache miss information may be modified. For instance, the D-cache miss information may be modified to indicate that an L2 cache prefetch and modified scheduling of the load instruction are unnecessary.

D-cache miss information and target addresses may be storied in a variety of ways which may include using instruction bits, I-line bits, and/or special caches. In one embodiment of the invention, D-cache miss information and target addresses (where necessary) may be stored for each load instruction. Optionally, in some cases, D-cache miss information and/or target addresses may only be stored from some instructions (e.g., instructions which result in D-cache misses or instructions in an I-line which result in a D-cache miss more frequently than other instructions in the same I-line).

Figure 7A:
FIG. 7A is a block diagram depicting an exemplary I-line used to store D-cache miss information and/or target addresses for a load instruction in the I-line according to one embodiment of the invention.

In one embodiment, D-cache miss information and/or target addresses may be stored in an I-line containing the load instruction. FIG. 7A is a block diagram depicting an exemplary I-line 702 used to store D-cache miss information and/or target addresses for a load instruction in the I-line 702 according to one embodiment of the invention.

As depicted, the I-line may contain multiple instructions (Instruction 1, Instruction 2, etc.), bits used to store an address (for example, an effective address, EA), and bits used to store control information (CTL). In one embodiment of the invention, the control bits CTL depicted in FIG. 7A may be used to store D-cache miss information (e.g., the MIS and/or HIS bits) for a load instruction and the EA bits may be used to store the target address of data requested by the load instruction.

As an example of storing D-cache miss information in the I-line 702, as instructions in the I-line 702 are executed, the processor core 114 may determine whether a load instruction within the I-line has caused a D-cache miss. If a D-cache miss is detected, the target address (or a portion thereof) for the instruction may be stored in EA and other miss information (e.g., the MIS or HIS bits) may be stored in the CTL bits. In some cases, the location of the load instruction within the I-line 702 may also be stored in the CTL bits. For example, if each I-line contains 32 instructions, a five-bit binary number (containing enough bits to identify an instruction location) stored in the CTL bits may be used to identify the load instruction corresponding to the stored D-cache miss information and target address.

In one embodiment of the invention, where target address and/or D-cache miss information is stored in I-lines, each level of cache and/or memory used in the system 100 may contain a copy of the information contained in the I-lines. In another embodiment of the invention, only specified levels of cache and/or memory may contain the information contained in the instructions and/or I-line. Cache coherency principles, known to those skilled in the art, may be used to update copies of the I-line in each level of cache and/or memory.

It is noted that in traditional systems which utilize instruction caches, instructions are typically not modified by the processor 110. Thus, in traditional systems, I-lines are typically aged out of the I-cache 222 after some time instead of being written back to the L2 cache 112. However, as described herein, in some embodiments, modified I-lines and/or instructions may be written back to the L2 cache 112, thereby allowing the prefetch data to be maintained at higher cache and/or memory levels.

As an example, when instructions in an I-line have been processed by the processor core (possibly causing the target address and/or D-cache miss information to be updated), the I-line may be written into the I-cache 222 (e.g., using write back circuitry 238), possibly overwriting an older version of the I-line stored in the I-cache 222. In one embodiment, the I-line may only be placed in the I-cache 222 where changes have been made to information stored in the I-line. Optionally, in one embodiment, I-lines may always be written back to the I-cache 222.

According to one embodiment of the invention, when a modified I-line is written back into the I-cache 222, the I-line may be marked as changed. Where an I-line is written back to the I-cache 222 and marked as changed, the I-line may remain in the I-cache for differing amounts of time. For example, if the I-line is being used frequently by the processor core 114, the I-line may be fetched and returned to the I-cache 222 several times, possibly be updated each time. If, however, the I-line is not frequently used (referred to as aging), the I-line may be purged from the I-cache 222. When the I-line is purged from the I-cache 222, a determination may be made of whether the I-line is marked as changed. Where the I-line is marked as changed, the I-line may be written back into the L2 cache 112. Optionally, the I-line may always be written back to the L2 cache 112. In one embodiment, the I-line may optionally be written back to several cache levels at once (e.g., to the L2 cache 112 and the I-cache 222) or to a level other than the I-cache 222 (e.g., directly to the L2 cache 112).

In one embodiment, the target address of data requested by the load instruction may be stored directly in (appended to) an I-line as depicted in FIG. 7A. The stored target address EA may be an effective address or a portion of an effective address (e.g., a high order 32 bits of the effective address). The target address EA may either identify the data requested by the load instruction or, optionally, a D-line containing the address of the targeted data. According to one embodiment, the I-line may store multiple addresses, with each address corresponding to a load instruction in the I-line.

In some cases, the EA and/or CTL bits may be stored in bits allocated for that purpose in the I-line. Optionally, in one embodiment of the invention, effective address bits EA and control bits CTL described herein may be stored in otherwise unused bits of the I-line. For example, each information line in the L2 cache 112 may have extra data bits which may be used for error correction of data transferred between different cache levels (e.g., an error correction code, ECC, used to ensure that transferred data is not corrupted and to repair any corruption which does occur). In some cases, each level of cache (e.g., the L2 cache 112 and the I-cache 222) may contain an identical copy of each I-line. Where each level of cache contains a copy of a given I-line, an ECC may not be utilized. Instead, for example, a parity bit may used to determine if an I-line was properly transferred between caches. If the parity bit indicates that an I-line is improperly transferred between caches, the I-line may be refetched from the transferring cache (because the transferring cache is inclusive of the line) instead of performing error checking.

As an example of storing addresses and control information in otherwise unused bits of an I-line, consider an error correction protocol which uses eleven bits for error correction for every two words stored. In an I-line, one of the eleven bits may be used to store a parity bit for every two instructions (where one instruction is stored per word). The remaining five bits per instruction may be used to store control bits for each instruction and/or address bits. For example, four of the five bits may be used to store D-cache miss information (such as MIS and/or HIS bits) for the instruction. If the I-line includes 32 instructions, the remaining 32 bits (one bit for each instruction) may be used to store, for example all or a portion of a target address of the load instruction. As described above, in some cases, a target address for each load instruction may be extracted and stored in an I-line. Optionally, a target address for the most frequently executed load instruction(s) may be extracted and stored in the I-line.

In one embodiment of the invention, an I-line may contain multiple load instructions, and D-cache miss information may be stored for each of the load instructions. In one embodiment, multiple D-cache miss histories may be tracked, but only one target address, corresponding to the most frequently predicted D-cache miss out of the instructions may be stored in EA. Optionally, target addresses for each load instruction resulting in a D-cache miss may be stored in a single I-line. As described below, where an effective address for a load instruction is not stored (e.g., because D-cache misses caused by the load instruction are not predictable or above a threshold for prediction), the load instruction may be issued to the least delayed pipeline for execution (e.g., as described with respect to FIGS. 4A-B above), thereby quickly resolving the target address of the load instruction and determining whether the load instruction results in a D-cache miss.

Figure 7B:
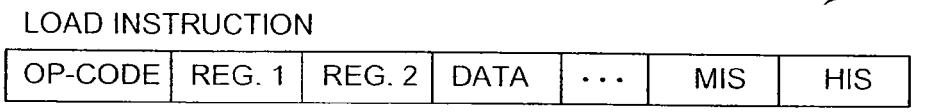
FIG. 7B is a block diagram depicting an exemplary re-encoded load instruction according to one embodiment of the instruction.

In some cases, D-cache miss information may be stored in the load instruction after the instruction is decoded and/or executed (referred to a re-encoding). FIG. 7B is a block diagram depicting an exemplary re-encoded load instruction 704 according to one embodiment of the instruction. The load instruction 704 may contain an Operation Code (Op-Code) used to identify the type of instruction, one or more register operands (Reg. 1, Reg. 1), and/or data. As depicted, the load instruction 704 may also contain bits used to store MIS and/or HIS bits.

When the load instruction 704 is executed, a determination may be made of whether the load instruction results in a D-cache miss. As a result of the determination, the MIS and/or HIS bits may be modified as described above. The MIS and/or HIS bits may then be encoded into the instruction 704, such that when the instruction is subsequently decoded, the MIS and/or HIS bits may be examined, for example, by the predecoder and scheduler 220. The predecoder and scheduler may then initiate an L2 cache access and schedule the load instruction 704 for execution as appropriate. As described above, in some cases, when a load instruction 704 is re-encoded, the I-line containing that instruction may be marked as changed and written back to the I-cache 222.

In one embodiment, other bits of the instruction 704 may also be used for re-encoding the instruction. For example, bits in the instruction 704 may be used to record whether the load instruction is independent and/or resolvable. Also, bits in the instruction 704 may be used to record whether the instruction may be assigned to a given pipeline, e.g., the most delayed pipeline.

In one embodiment, bits in the instruction 704 may be re-encoded after the instruction has been executed, as described above. In some cases, the D-cache miss information may also be encoded in the instruction when the instruction is compiled from higher level source code. For example, in one embodiment, a compiler used to compile the source code may be designed to recognize load instructions which may result in a D-cache miss and set MIS and/or HIS bits in the load instruction accordingly.

Optionally, once the source code of a program has been created, the source code may be compiled into instructions and the instructions may then be executed during a test execution. The test execution and the results of the test execution may be monitored to determine which load instructions result in a D-cache miss. The source code may then be recompiled such that the MIS and/or HIS bits for the load instruction are set to appropriate values in light of the test execution. In some cases, the test execution may be performed on the processor 110. In some cases, control bits or control pins in the processor 110 may be used to place the processor 110 in a special test mode for the test execution. Optionally, a special processor, designed to perform the test execution and monitor the results, may be utilized.

In one embodiment of the invention, D-cache miss information (MIS and/or HIS bits) may be stored in a special cache, referred to as a shadow cache. For example, when a load instruction results in a D-cache miss, an entry may be placed in the shadow cache. The address of a load instruction (or, optionally, the address of an I-line containing the load instruction) may be used as an index into the shadow cache. Information used to determine the target address of a load instruction (e.g., an effective address calculated during pre-decoding or during a previous execution of the load instruction) may also be maintained in the shadow cache. The target address information may be used, as described above, for initiating an L2 cache access when the issue group containing the load instruction is issued to the processor core 114 (or at any other suitable time).

In one embodiment, when an I-line containing a load instruction is received (e.g., by the predecoder and scheduler 220), the shadow cache may be searched (e.g., the shadow cache may be content addressable) for an entry (or entries) corresponding to the fetched I-line (e.g., an entry with the same effective address as the fetched I-line). If a corresponding entry is found, the D-cache miss history information and/or target address(es) associated with the entry may be used by the predecoder and scheduler 220 or other circuitry to schedule the load instruction and initiate an L2 cache, if necessary.

In one embodiment of the invention, the shadow cache may both store control bits (e.g., D-cache miss information) and target addresses as described above. Optionally, the control bits may be stored in the I-line and/or in individual instructions while other information is stored in the shadow cache. In either case, in one embodiment, entries in the shadow cache may be managed according any of the principles enumerated above with respect to determining which entries are to be stored in an I-line. As an example, a target address for a load instruction which results in strongly predicted D-cache misses may be stored in the shadow cache, whereas target addresses stored in the shadow cache which correspond to weakly predicted D-cache misses may be overwritten.

In addition to using the techniques described above to determine which entries to store in the shadow cache, in one embodiment, traditional cache management techniques may be used to manage the shadow cache, either exclusively or including the techniques described above. For example, entries in the shadow cache may have age bits which indicate the frequency with which entries in the shadow cache are accessed. If a given entry is frequently accessed, the age value may remain small (e.g., young). If, however, the entry is infrequently accessed, the age value may increase, and the entry may in some cases be discarded from the shadow cache.

In one embodiment of the invention, the target address and D-Cache miss information may be continuously tracked and updated while instructions are being executed such that the D-cache miss information and other stored values may change over time as a given set of instructions is executed. Thus, the target address and the D-cache miss information may be dynamically modified, for example, as a program is executed.

In another embodiment of the invention, the target address and D-cache miss information may be stored during an initial execution phase of a set of instructions (e.g., during an initial "training" period in which a program is executed). The initial execution phase may also be referred to as an initialization phase or a training phase. During the training phase, D-cache miss information may be tracked and one or more target addresses may be stored (e.g., in the I-line containing the instruction or in a shadow cache) according to the criteria described above. When the training phase is completed, the stored target addresses and D-cache miss information may continue to be used to perform data prefetches and schedule execution of load instructions.

In one embodiment, one or more bits (stored, for example, in the I-line containing the load instruction or in a special cache or register) may be used to indicate whether an instruction is being executed in a training phase or whether the processor 110 is in a training phase mode. For example, a mode bit in the processor 110 may be cleared during the training phase. While the bit is cleared, the D-cache miss information may be tracked and the target address(es) may be updated as described above. When the training phase is completed, the bit may be set. When the bit is set, the target address(es) may no longer be updated and the training phase may be complete.

In one embodiment, the training phase may continue for a specified period of time (e.g., until a number of clock cycles has elapsed, or until a given instruction has been executed a number of times). In one embodiment, the most recently stored target address(es) and/or D-cache miss information may remain stored when the specified period of time elapses and the training phase is exited.

In another embodiment of the invention, the training phase may continue until one or more exit criteria are satisfied. For example, where D-cache miss histories are stored, the initial execution phase may continue until a D-cache miss becomes predictable (or strongly predictable). When the outcome of a load instruction becomes predictable, a lock bit may be set in the I-line indicating that the initial training phase is complete and that the target address for the strongly predictable load instruction may be used for subsequent prefetching and scheduling performed when the instruction is fetched from the L2 cache 112.

In another embodiment of the invention, the target addresses and cache miss information may be modified in intermittent training phases. For example, a frequency and duration value for each training phase may be stored. Each time a number of clock cycles corresponding to the frequency has elapsed, a training phase may be initiated and may continue for the specified duration value. In another embodiment, each time a number of clock cycles corresponding to the frequency has elapsed, the training phase may be initiated and continue until specified threshold conditions are satisfied (for example, until a specified level of D-cache miss predictability for an instruction is reached, as described above).

In some cases, the MIS bit and/or HIS bits may only be set for loads that can be issued to the most delayed execution pipeline. Optionally, a second bit, indicative of whether the instruction is an independent and/or preresolvable instruction, may be re-encoded into the instruction and used along with the MIS bit and/or HIS bits to determine the appropriate scheduling of the instruction.

Further Embodiments

In one embodiment of the invention, where the MIS and/or HIS bits have not been set, where the MIS and/or HIS bits predict that a load instruction will not result in a D-cache miss, and/or where the target address for a load instruction has not been calculated and/or stored, the load instruction may be scheduled to be executed in the least delayed pipeline (e.g., $P_0$) so that the result of the instruction (e.g., whether the instruction results in a D-cache miss and/or the target address of the instruction) may be resolved quickly and any resulting stall or instruction invalidation (if any) in the processor core 114 may be minimized. Otherwise, where a D-cache miss is predicted and a valid target address is available, the instruction may be issued to the most delayed pipeline and an L2 cache access may be initiated as described above.

Figure 8B:
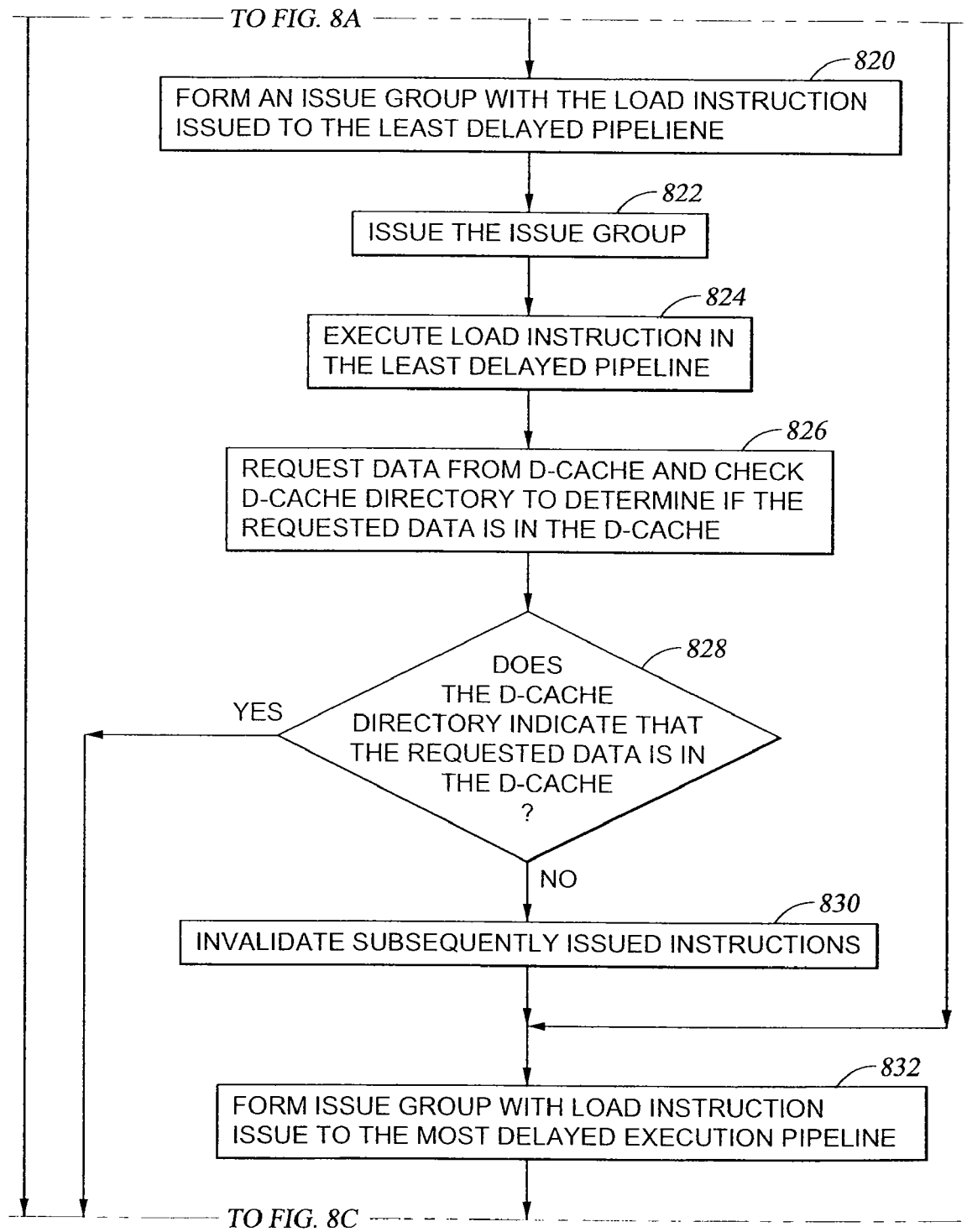
Figure 8C:
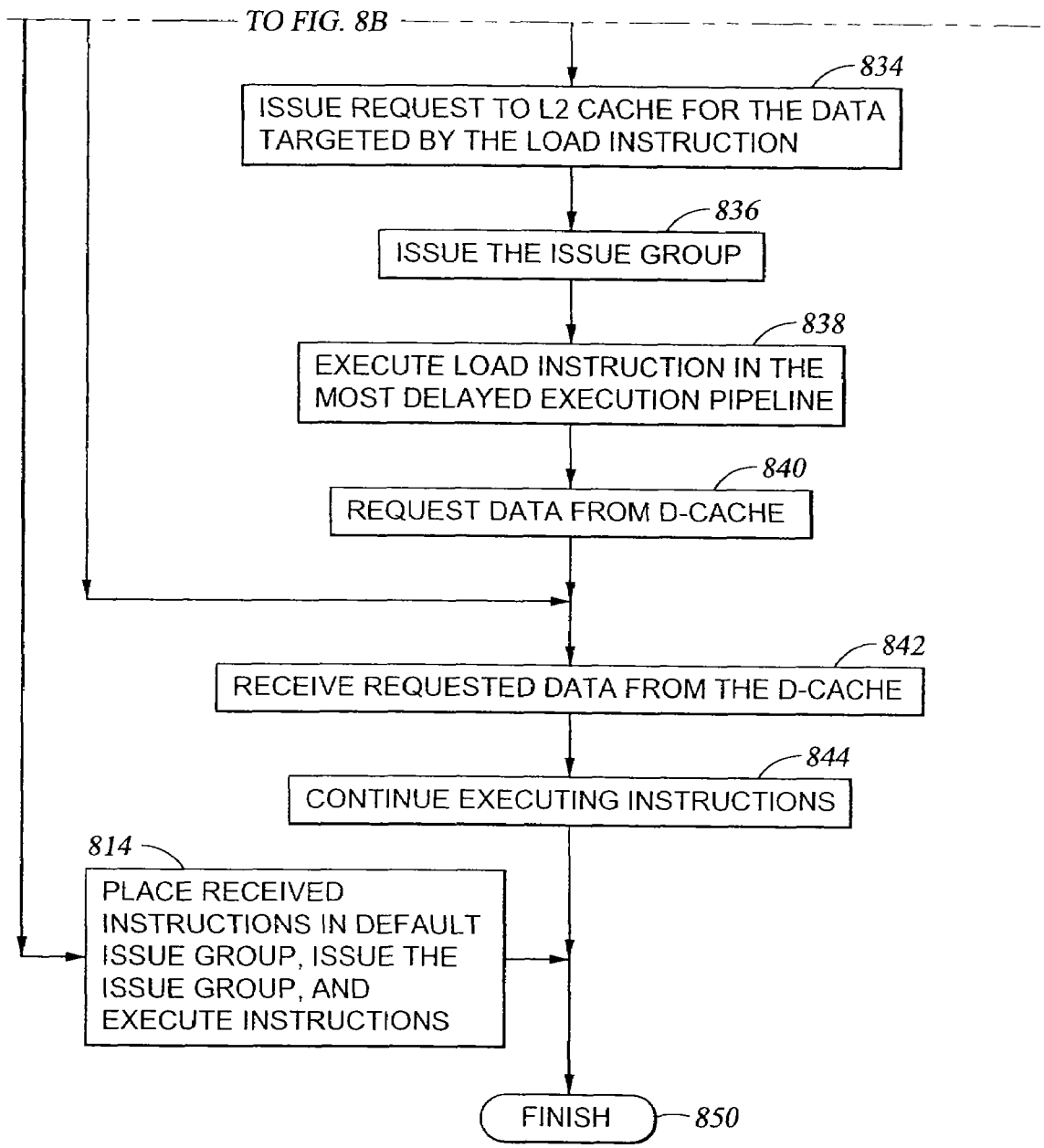

FIGS. 8A-C is a flow diagram depicting a process 800 for using D-cache miss information to determine the scheduling of a load instruction according to one embodiment of the invention. As depicted, the process 800 may begin at step 802 and continue to step 804 where instructions to be executed in an issued group are received. If the received instructions do contain a load instruction, a determination may be made at step 808 of whether the load instruction previously caused a cache miss. The determination of whether the load instruction previously caused a cache miss may be made, for example, by checking the MIS bit. If the MIS bit is set, it may indicate that the load instruction previously caused a cache miss.

If the load instruction did previously result in a cache miss, a determination may be made at step 810 of whether the load instruction can be scheduled to execute in the most delayed execution pipeline. As described above, an instruction may be unable to be executed in the most delayed pipeline where the most delayed pipeline does not provide a function required by the load instruction, where another instruction is required to be issued to the most delayed pipeline, where the target address for the instruction has not been calculated, or for any other reason. Optionally, if the instruction cannot be issued to the most delayed pipeline, an attempt may be made to issue the instruction to the next available pipeline with the greatest delay.

If the load instruction can be scheduled to execute in the most delayed pipeline, an issue group may be formed at step 832 with the load instruction issued to the most delayed pipeline. At step 834 a request may be issued to the L2 cache 112 for the data targeted by the load instruction and at step 836 the issue group may be issued. At step 838 the load instruction may be executed in the most delayed pipeline ($P_3$). Then, at step 840, the data targeted by the load instruction may be requested from the D-cache 224.

At step 842, assuming the requested data has been retrieved from the L2 cache 112 and placed in the D-cache 224, the requested data may be received from the D-cache 224. Then, at step 844 the processor core 114 may continue executing instructions and the process 800 may finish at step 850.

Referring back to steps 808 and 810, if the load instruction did not previously result in a D-cache miss, or if the load instruction cannot be scheduled to execute in the most delayed pipeline, the process 800 may attempt to schedule the load instruction to the least delayed pipeline to determine whether the load instruction will result in a D-cache miss and/or determine the target address of the load instruction. Thus, at step 812 a determination may be made of whether the load instruction can be scheduled to execute in the least delayed execution pipeline. If the load instruction cannot be executed in the least delayed pipeline, the received instructions may be placed in a default issue group, issued, and executed at step 814.

If the load instruction can be scheduled to execute in the least delayed execution pipeline, an issued group with the load instruction issued to the least delayed pipeline ($P_0$) may be formed at step 820 and the issue group may be issued at step 822.

At step 824 the load instruction may be executed in the least delayed pipeline. At step 825, data for the load instruction may be requested from the D-cache 224 and the D-cache directory 225 may be checked to determine if the requested data is in the D-cache 224. Then, at step 828, a determination may be made of whether the D-cache directory 225 indicates that the requested data is in the D-cache 224. If the requested data is in the D-cache 224, the requested data may be received at step 842 and the process 800 may continue executing instructions at step 844.

If, however, the D-cache 224 does not contain the requested data, instructions subsequently issued to the processor core 114 may be invalidated at step 830 and an issue group with the load instruction issued to the most delayed execution pipeline (if possible) may be formed at step 832. Then, as described above, a request may be sent to the L2 cache 112 for the requested data. Optionally, as soon as the D-cache directory 225 indicates that the requested data is not in the D-cache 224, a request may be automatically forwarded to the L2 cache 112 for the data targeted by the load instruction. The process 800 may then continue as described by issuing the issue group (step 836), executing the load instruction (step 838), requesting (step 840) and receiving (step 842) the data from the D-cache 224, continuing with the execution of instructions (step 844), and finishing at step 850.

Thus, as described above, by issuing a load instruction which is predicted to result in a D-cache miss to the most delayed execution pipeline, a processor stall may be prevented or reduced by delaying execution of the load instruction while the data requested by the load instruction is fetched from higher levels of cache and/or memory. However, where a load instruction has not been previously executed, where the load instruction is unpredictable with respect to causing a D-cache miss, or where the data targeted by the load instruction cannot be determined, the instruction may be issued to the least delayed execution pipeline, thereby allowing the outcome of the instruction to be resolved quickly and minimizing any resulting stall of the processor core 114.

Figure 9:
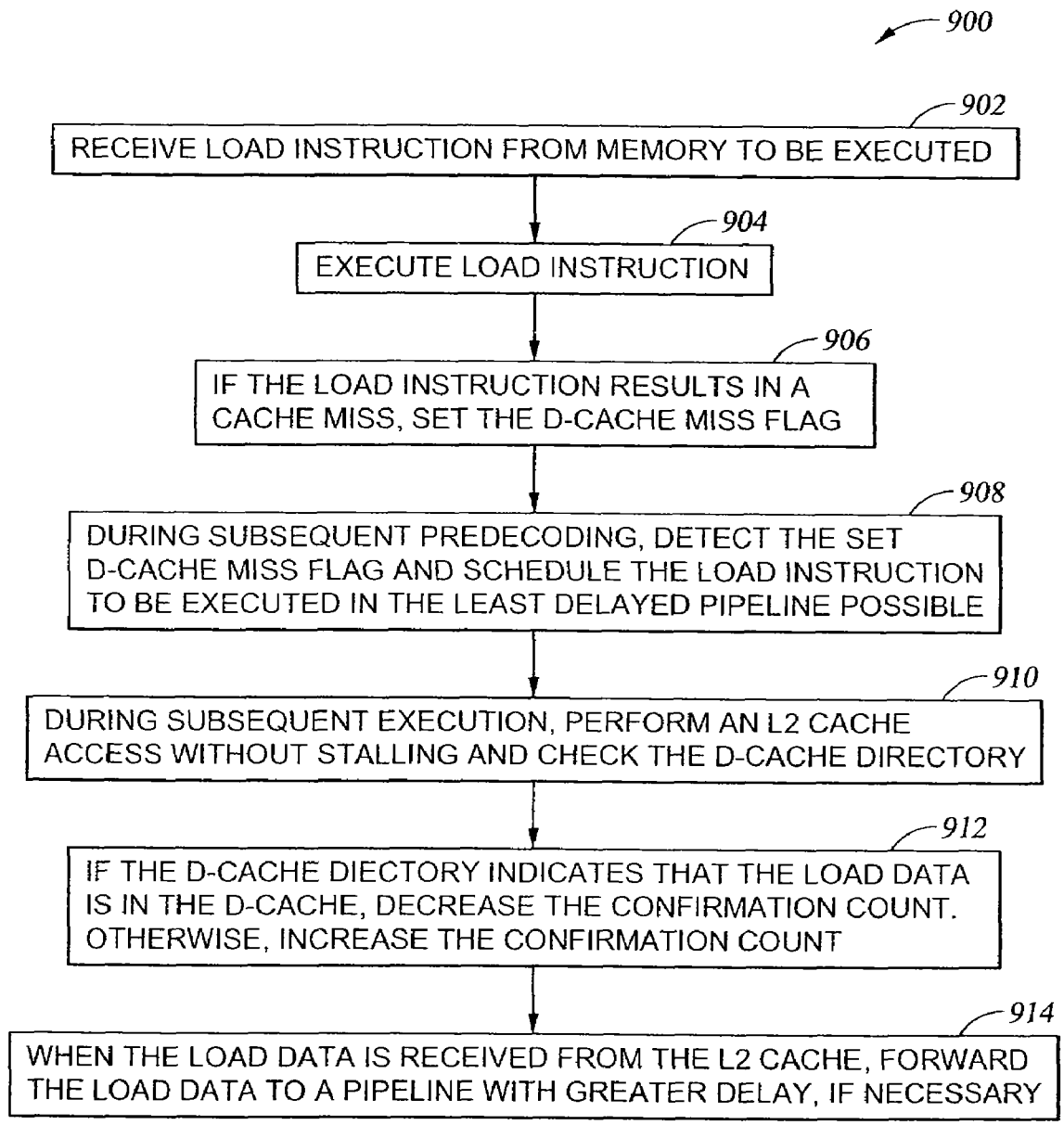
FIG. 9 is a flow diagram depicting a process for using D-cache miss information to determine the scheduling of a load instruction to a least-delayed execution pipeline according to one embodiment of the invention.

In some cases, a load instruction with a set D-cache miss flag may be scheduled for execution in a least-delayed or less delayed pipeline and the results of the load instruction may be forwarded to another pipeline (e.g., a pipeline in which execution is delayed). For example, FIG. 9 is a flow diagram depicting a process 900 for using D-cache miss information to determine the scheduling of a load instruction according to one embodiment of the invention. As depicted, the process 900 may begin at step 902 where a load instruction to be executed is received from memory. At step 904, the load instruction may be executed, and at step 906, if the load instruction results in a cache miss, a flag indicating the D-cache miss may be set.

At step 908, during subsequent predecoding, the set D-cache miss flag may be detected, and the load instruction may be scheduled to be executed in the least delayed execution pipeline possible (e.g., pipeline P0). For example, if the least delayed pipeline is not available, the load instruction may be scheduled for execution in a pipeline which is less-delayed with respect to other pipelines in the processor core 114 (e.g., pipeline P1, P2, etc.). In some cases, such scheduling (e.g., to the least-delayed or a less-delayed pipeline) may be performed only if the load instruction may be issued to the pipeline without stalling execution of instructions (e.g., to allow other instructions scheduled for execution in the first pipeline to be executed). Optionally, the load instruction may be scheduled for execution in the least-delayed or a less-delayed execution pipeline even if the scheduling results in a stall.

In some cases, a confirmation count may be recorded. As described in greater detail below, the confirmation count may be used to determine whether the D-cache miss flag accurately identifies a load instruction which may result in a D-cache miss. If the D-cache miss flag does not accurately identify a load instruction which may result in a D-cache miss, then, in some cases, the flag may be disregarded for scheduling purposes or may modify the conditions under which the load instruction is scheduled.

Accordingly, at step 910, during subsequent execution of the load instruction, an L2 cache access may be performed to obtain the load data, but the D-cache directory 225 may be checked to determine if the load data is already in the D-cache 224. If the data is in the D-cache 224 (as indicated by the D-cache directory 225), the confirmation count may be decreased at step 912 (stopping when the count reaches zero), indicating that the data in question is already in the D-cache 224 and that no D-cache miss occurred. Otherwise, if the data is not in the D-cache 224, the count may be increased (until the counter saturates), indicating that a D-cache miss did occur.

At step 914, when the load data is received from the L2 cache 112, the load data may be forwarded to a pipeline with a greater delay in execution (e.g., greater than the delay of the pipeline executing the load instruction), if such forwarding is necessary for executing the instruction in the pipeline receiving the forwarded load data. In some cases, the amount of difference in the delay of the pipelines may be greater than or equal to the L2 cache access latency, thereby allowing the L2 cache access for the load instruction to be finished before the forwarding is performed. Thus, by executing the load instruction in the least delayed execution pipeline, the load data may be received in time to be forwarded and utilized by other instructions, e.g., being executed in pipelines with greater delays in execution.

Figure 10:
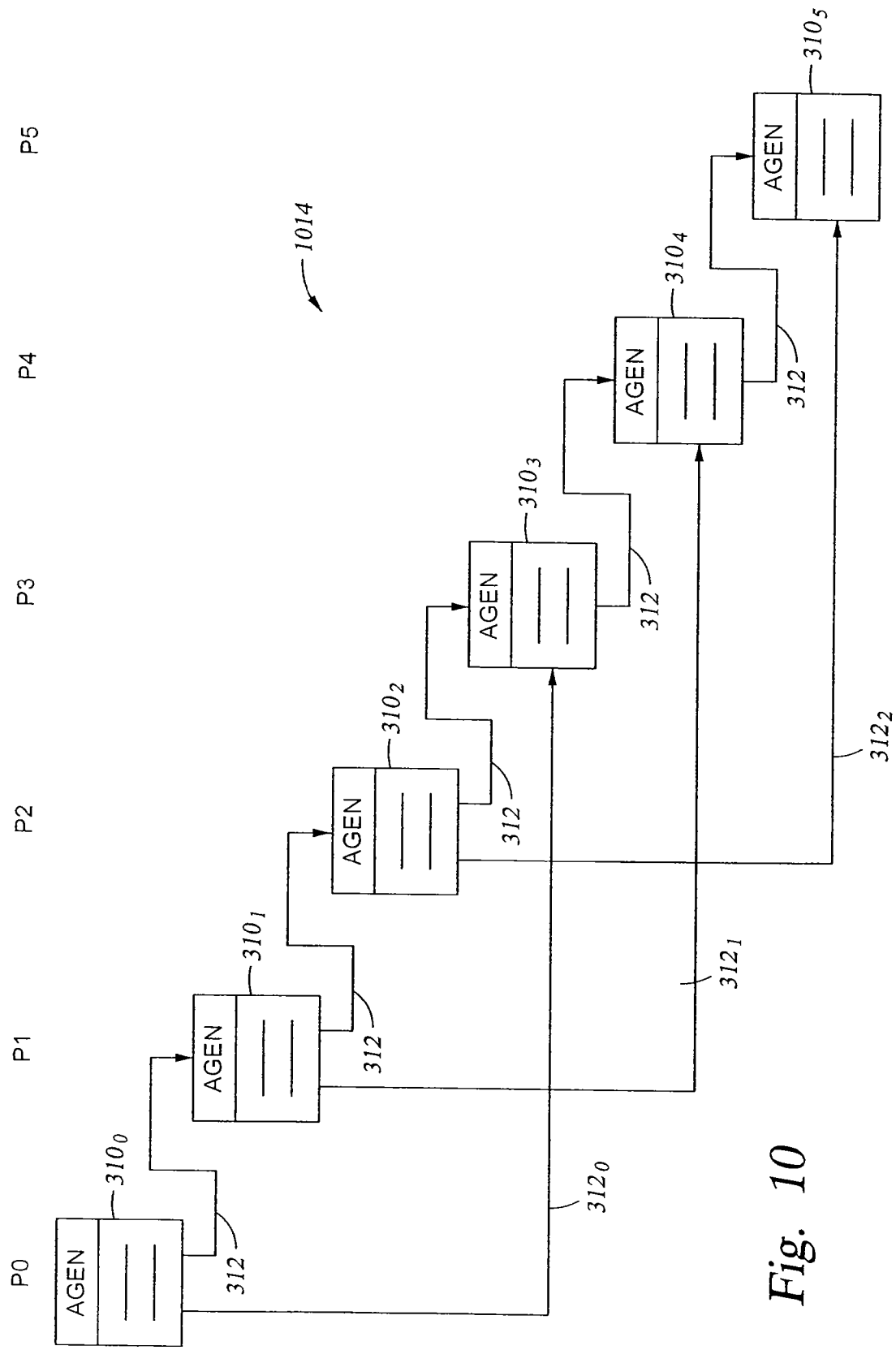
FIG. 10 is a block diagram depicting a cascaded, delayed execution pipeline with forwarding paths according to one embodiment of the invention.

FIG. 10 is a block diagram depicting a processor core 1014 in which load data may be forwarded according to one embodiment of the invention. As depicted, the processor core may contain a plurality of delayed execution pipelines (P0, P1, . . . P5). In some cases, forwarding paths 312 may be provided from one execution unit 310 to other execution units. In some cases, forwarding $310_{0-2}$ may be provided from a less delayed execution pipeline to a greater delayed pipeline, and such forwarding $312_{0-2}$ may be used to forward the results of a load instruction to another instruction which utilizes the results. In some cases, the forwarding $312_{0-2}$ may be performed from an execution unit to another execution unit. Optionally, in some cases, the forwarding $312_{0-2}$ may be performed from a delay target queue 330 to an execution unit 310.

As stated above, in some cases the load instruction may be scheduled to be executed in one of several pipelines which are less-delayed with respect to other pipeline in the processor core 1014. For example, with respect to FIG. 10, scheduling a load instruction in pipeline P0 may allow forwarding to be performed from pipeline P0 to several of the pipelines with greater delay (e.g., pipeline P3, P4, or P5). If, however, another instruction is scheduled to be executed in pipeline P0 (e.g., because the instruction is executed before the load instruction may be executed), the load instruction may be placed in another pipeline which is less-delayed with respect to other pipelines in the core 1014 (e.g., pipeline P1 or P2). By placing the load instruction in the less-delayed pipelines, forwarding may be provided to one of the pipelines with greater pipelines. For example, pipeline P1 may provide forwarding to pipeline P4 or P5, and pipeline P2 may provide forwarding to pipeline P5. By providing a plurality of less-delayed pipelines from which load data may be forwarded, greater flexibility may be provided for scheduling execution of load instructions which may result in D-cache misses.

As stated above, the confirmation count may be used, for example, to determine how a load instruction is executed. For example, if the confirmation count is above a certain threshold (e.g., if the confirmation count is two or three), the load instruction may be issued to the least delayed or a less-delayed pipeline as described above, regardless of whether the load instruction is stalled during issue. For example, in some cases, a program may execute a chain of dependent loads in which each load utilizes the result of a previous load instruction to perform a subsequent load. Such dependent load chains may occur where a program utilizes a series of pointers to access data. Where a dependent load chain is received for execution by the processor 110, and where an instruction in the dependent load chain results in a cache miss (e.g., the first instruction in the dependent load chain), each of the instructions may be stalled until the data loaded by the first instruction is fetched. Such stalling may, in some cases, be beneficial because the processor 110 may consume less power while instruction execution is stalled and instructions are not being processed.

If the confirmation count is within another range, between an upper threshold and a lower threshold, (e.g., if the confirmation count is one), the predecoder and scheduler circuitry 220 may attempt to schedule the load instruction to the least delayed or a less-delayed execution pipeline, but if the load instruction cannot be scheduled to the least delayed or less-delayed execution pipeline without stalling, the processor may instead issue the load instruction to one of the processor pipelines (e.g., pipeline P3, P4, or greater) and forego executing the load instruction in one of the less-delayed pipelines.

Also, if the confirmation count is below a given threshold (e.g., below a low threshold, such as if the confirmation count is zero), the predecoder and scheduler 220 may predict that the load instruction will not result in cache miss and may place the load instruction in a default issue group for execution (e.g., the load instruction may be scheduled normally). Also, in some cases, if the confirmation count reaches zero, the D-cache miss flag for the load instruction may be cleared, even if the miss flag is a so-called "sticky bit".

In some cases, the processor 110 may detect load chains and modify storage of the D-cache miss information in response to detecting the dependent load chains. For example, where multiple load instructions attempting to access the same data line each result in a cache miss, it may be sufficient for the processor to mark only the first load instruction in the group of load instructions as a cache miss because, after the data line has been loaded by the first load instruction, the same data line may be utilized by the subsequent load instructions for immediate execution. Such a determination may include detecting multiple load instructions which result in a cache miss, comparing the load addresses for the multiple detected load instructions, and determining which of the detected load instructions have the same load addresses. When the processor 110 has determined which load instructions have the same load addresses, the processor may determine which load instruction was executed earliest (e.g., the first load instruction) and set the D-cache miss flag for only the first load instruction in the group of detected, matching load instructions.

In one embodiment, where an issue group contains multiple load instructions, each having an associated prediction level, preference in scheduling may be given according to the prediction level for each instruction. For example, where a load instruction is strongly predicted to result in a D-cache miss, that instruction may be scheduled to be executed in the most delayed pipeline over an instruction in the same issue group which is weakly predicted to result in a D-cache miss.

Optionally, the issue group may be split into two issue groups, allowing each instruction to be issued to the most delayed execution pipeline.

In some cases, the amount of delay in the most delayed execution pipeline may be selected such that the delay is greater than or equal to the amount of time necessary to complete an L2 cache access, thereby hiding the L2 cache access latency. For instance, the L2 cache access time may be measured from the time a determination is made that the L1 cache does not contain requested data to the time that the requested data is available from the L2 cache 112 (assuming the data does not have to be fetched from higher levels of cache and/or memory). In other words, if it takes 7 cycles to complete an L2 cache access after the L1 D-cache directory 225 indicates that the requested data is not in the D-cache 224, the amount of delay in the most delayed pipeline may be set as 7 cycles, thus allowing the instruction to be reissued to the most delayed pipeline, be held in the delay queue $310_3$, and executed as the requested data arrives from the L2 cache 112. Inserting such a delay into the most delayed execution pipeline may be performed, e.g., by inserting stage delays in the delay queues 320.

In some cases, before an L2 cache access is initiated (e.g., for a load instruction predicted to result in a D-cache miss), the L2 cache access circuitry 210 prefetches a D-line from the L2 cache, the L2 cache access circuitry 210 may first use the D-cache directory 225 to determine if the D-line containing the data targeted by the load instruction is already located in the D-cache. Where the L1 directory 225 indicates that the D-line is already located in the D-cache, an L2 prefetch may be unnecessary and the L2 prefetch circuitry may not issue a prefetch request to the L2 cache 112. Where the D-cache directory 225 indicates that the D-line is not already located in the D-cache 224, the L2 cache access circuitry 210 may request the appropriate D-line from the L2 cache 112.

In some cases, where the MIS bit has been set and predicts that an instruction is likely to result in a D-cache miss, the prediction may become unreliable, e.g., executing the instruction may not result in a D-cache miss. In such circumstances, the MIS bit may be later cleared if repeated executions of the instruction do not result in D-cache misses. For example, a counter may record the number of previous times in which the load instruction has not resulted in a D-cache miss. Each time the instruction results in a D-cache miss, the counter may be reset to 0. Each time the instruction does not result in a D-cache miss, the counter may be incremented. When the counter reaches a given threshold (e.g., 4 sequential non-misses), the prediction bit MIS may be cleared. Optionally, instead of resetting the counter each time the instruction results in a miss, the counter may be decremented.

By providing a mechanism for clearing the MIS prediction bit, the processor may avoid unnecessarily scheduling a given load instruction to the most delayed execution pipeline. Furthermore, where the prediction bit is cleared, another bit or bits may be set to indicate that whether the instruction results in a D-cache miss is unpredictable. As described above, where the outcome of a load instruction is unpredictable, the load instruction may be issued to the least delayed pipeline to resolve the outcome of the load instruction early and thereby minimize any resulting processor stall.

While the foregoing is directed to embodiments of the present invention, other and further embodiments of the invention may be devised without departing from the basic scope thereof, and the scope thereof is determined by the claims that follow.

What is claimed is:

1. An integrated circuit device, comprising:
a cascaded delayed execution pipeline unit having two or more execution pipelines that begin execution of instructions in a common issue group in a delayed manner relative to each other; and
circuitry configured to:
receive an issue group of instructions;
determine whether the issue group includes a load instruction;
upon determining that the issue group includes a load instruction, schedule the load instruction to be executed in a first pipeline of the two or more execution pipelines, and schedule each remaining instruction in the issue group to be executed in remaining pipelines of the two or more pipelines, wherein execution of the load instruction in the first pipeline begins prior to beginning execution of the remaining instructions in the remaining pipelines;
issue the issue group to the cascaded delayed execution pipeline unit;
determine whether the load instruction results in a cache miss; and
if the load instruction results in a cache miss in a level one cache:
request target data for the load instruction from a level two cache; and
schedule the load instruction to be executed in a second pipeline of the two or more execution pipelines, and schedule each remaining instruction in the issue group to be executed in remaining pipelines of the two or more pipelines, wherein execution of the load instruction in the second pipeline begins after beginning execution of one or more remaining instructions in one or more remaining pipelines.

2. The integrated circuit device of claim 1, wherein, during a subsequent execution of the load instruction, upon determining that the load instruction did not previously result in one or more cache misses, the load instruction is scheduled to be executed in the first pipeline in which execution of the load instruction begins prior to beginning execution of the remaining instructions in the remaining pipelines.

3. The integrated circuit device of claim 1, wherein, when the load instruction results in the cache miss, at least a portion of a target address of data requested by the load instruction is appended to an instruction line containing the load instruction.

4. The integrated circuit device of claim 1, wherein, when the load instruction results in the cache miss, one or more instructions issued after the load instruction are invalidated.

5. A processor comprising:
a level two cache;
a level one cache;
a cascaded delayed execution pipeline unit having two or more execution pipelines that begin execution of instructions in a common issue group in a delayed manner relative to each other;
predecoder circuitry configured to:
receive from the level two cache a group of instructions to be issued as an issue group;
determine whether the group of instructions includes a load instruction;
upon determining that the group of instructions includes a load instruction, schedule the load instruction to be executed in a first pipeline of the two or more execution pipelines, and schedule each remaining instruction in the group of instructions to be executed in remaining pipelines of the two or more pipelines, wherein execution of the load instruction in the first pipeline begins prior to beginning execution of the remaining instructions in the remaining pipelines; and
send the group of instructions to the level one cache, wherein, when the load instruction results in a cache miss, target data for the load instruction is requested from the level two cache and a second issue group is formed wherein the load instruction is scheduled to be executed in a second pipeline of the two or more execution pipelines, and schedule each remaining instruction in the second issue group of instructions to be executed in remaining pipelines of the two or more pipelines, wherein execution of the load instruction in the second pipeline begins after beginning execution of one or more remaining instructions in one or more remaining pipelines.

6. The processor of claim 5, further comprising:
dispatch circuitry configured to:
receive the group of instructions from the level one cache;
organize the group of instructions into the issue group; and
dispatch the issue group to the cascaded delayed execution pipeline unit.

7. The processor of claim 5, wherein the second pipeline comprises a delay queue and an execution unit, wherein the load instruction is held in the delay queue while the one or more remaining instructions of the second issue group is executed in the one or more remaining pipelines, and wherein the load instruction is executed in the execution unit after the one or more remaining instructions have been executed.

8. An integrated circuit device, comprising:
a cascaded delayed execution pipeline unit having two or more execution pipelines that begin execution of instructions in a common issue group in a delayed manner relative to each other; and
circuitry configured to:
receive an issue group of instructions;
determine whether the issue group includes a load instruction;
upon determining that the issue group includes a load instruction, schedule the load instruction to be executed in a first pipeline of the two or more execution pipelines, and schedule each remaining instruction in the issue group to be executed in remaining pipelines of the two or more pipelines, wherein execution of the load instruction in the first pipeline begins prior to beginning execution of the remaining instructions in the remaining pipelines;
issue the issue group to the cascaded delayed execution pipeline unit;
determine whether the load instruction results in a cache miss; and
if the load instruction results in a cache miss in a level one cache:
encode the load instruction with at least one bit indicating that the cache miss occurred;
request target data for the load instruction from a level two cache; and
schedule the load instruction to be executed in a second pipeline of the two or more execution pipelines, and schedule each remaining instruction in the issue group to be executed in remaining pipelines of the two or more pipelines, wherein execution of the load instruction in the second pipeline begins after beginning execution of one or more remaining instructions in one or more remaining pipelines.

9. The integrated circuit device of claim 8, wherein the encoded load instruction is written back to the level one cache.

10. The integrated circuit device of claim 8, wherein the load instruction is encoded with the at least one bit if the cache miss occurs during a training phase, and wherein the load instruction is not encoded with the at least one bit after the training phase has expired.

* * * * *